(12) United States Patent
Lee

(10) Patent No.: US 11,323,763 B2
(45) Date of Patent: May 3, 2022

(54) DISPLAY APPARATUS AND METHOD OF OPERATING THE SAME

(71) Applicant: SAMSUNG ELECTRONICS CO., LTD., Suwon-si (KR)

(72) Inventor: Jae-gu Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 15/935,737

(22) Filed: Mar. 26, 2018

(65) Prior Publication Data
US 2018/0316963 A1 Nov. 1, 2018

Related U.S. Application Data

(60) Provisional application No. 62/491,571, filed on Apr. 28, 2017.

(30) Foreign Application Priority Data

Sep. 22, 2017 (KR) ........................ 10-2017-0122879

(51) Int. Cl.
H04N 21/431 (2011.01)
H04N 21/482 (2011.01)
(Continued)

(52) U.S. Cl.
CPC ..... *H04N 21/4312* (2013.01); *G06F 3/04855* (2013.01); *H04N 21/42204* (2013.01); *H04N 21/4383* (2013.01); *H04N 21/482* (2013.01)

(58) Field of Classification Search
CPC ............. H04N 21/482; H04N 21/4312; H04N 21/4383; H04N 21/42204;
(Continued)

(56) References Cited

U.S. PATENT DOCUMENTS 6,175,362 B1   1/2001   Harms et al.
9,753,561 B2   9/2017   Lee et al.
(Continued)

FOREIGN PATENT DOCUMENTS

CN     1269097 A    10/2000
CN   101035222 A     9/2007
(Continued)

OTHER PUBLICATIONS

Communication dated Aug. 20, 2018, issued by the Korean Intellectual Property Office in counterpart Korean Patent Application No. 10-2017-0122879.
(Continued)

Primary Examiner — Nathan J Flynn
Assistant Examiner — Christine A Kurien
(74) Attorney, Agent, or Firm — Sughrue Mion, PLLC

(57) ABSTRACT

A display apparatus and a method of operating the same are provided. The display apparatus includes a display; a memory; and a processor configured to execute at least one instruction stored in the memory so as to: receive a channel control input; identify an image providing source of the display apparatus in response to recognizing the channel control input as a pre-designated input; generate a channel scroll user interface (UI) based on channel information corresponding to the image providing source of the display apparatus; and control the display to display the generated channel scroll UI. The channel scroll UI includes a plurality of channel items included in the channel information corresponding to the image providing source, and a current channel indicator indicating a current channel item from among the plurality of channel items, the current channel item corresponding to content currently displayed on the display apparatus.

17 Claims, 13 Drawing Sheets

(51) Int. Cl.
*H04N 21/438* (2011.01)
*H04N 21/422* (2011.01)
*G06F 3/04855* (2022.01)

(58) Field of Classification Search
CPC .......... H04N 21/42215; H04N 21/431; H04N 21/4825; G06F 3/04855
See application file for complete search history.

(56) References Cited

U.S. PATENT DOCUMENTS

| | | | |
|---|---|---|---|
| 2008/0235617 | A1 | 9/2008 | Kim et al. |
| 2010/0157170 | A1 | 6/2010 | Carlsgaard et al. |
| 2011/0164189 | A1* | 7/2011 | Asayama ............... G08C 17/00 348/734 |
| 2011/0271302 | A1* | 11/2011 | Carlsgaard ........... H04N 21/482 725/39 |
| 2015/0082356 | A1* | 3/2015 | Naito ................. H04N 21/8405 725/53 |
| 2015/0156548 | A1 | 6/2015 | Sirpal et al. |
| 2015/0281765 | A1 | 10/2015 | Lee et al. |
| 2016/0142662 | A1* | 5/2016 | Lee ....................... G06F 3/0482 348/734 |
| 2017/0064215 | A1* | 3/2017 | Cho ................... H04N 21/4532 |
| 2017/0264944 | A1* | 9/2017 | Ok .................. H04N 21/42218 |

FOREIGN PATENT DOCUMENTS

| | | |
|---|---|---|
| CN | 101335845 A | 12/2008 |
| CN | 101415083 A | 4/2009 |
| CN | 105227985 A | 1/2016 |
| JP | 08-140002 A | 5/1996 |
| JP | 3399121 B2 | 4/2003 |
| JP | 2013-143774 A | 7/2013 |
| KR | 10-2008-0086265 A | 9/2008 |
| KR | 10-2015-0111776 A | 10/2015 |
| WO | 99/04560 A1 | 1/1999 |
| WO | 2011028692 A1 | 3/2011 |

OTHER PUBLICATIONS

Communication dated Jul. 16, 2018, issued by the European Patent Office in counterpart European Application No. 18164400.6.
Communication dated Feb. 20, 2019, issued by the Korean Intellectual Property Office in corresponding Korean Application No. 10-2017-0122879.
Communication dated Oct. 9, 2020, from the European Patent Office in counterpart European Application No. 18164400.6.
Communication dated Oct. 26, 2020, from the State Intellectual Property Office of People's Republic of China in counterpart Application No. 201810393715.6.
Communication dated May 8, 2021, from The China National Intellectual Property Administration in Application No. 201810393715.6.
Communication dated Apr. 24, 2020, from the State Intellectual Property Office of People's Republic of China in counterpart Application No. 201810393715.6.
Communication dated Dec. 23, 2021 by the State Intellectual Property Office of P.R. China in English counterpart Chinese Patent Application No. 201810393715.6.
Communication dated Mar. 16, 2022 issued by the State Intellectual Property Office of the P.R.China in English application No. 201810393715.6.

* cited by examiner

DISPLAY APPARATUS AND METHOD OF OPERATING THE SAME

CROSS-REFERENCE TO RELATED APPLICATIONS

This application is based on and claims the benefit of U.S. Provisional Patent Application No. 62/491,571, filed on Apr. 28, 2017, in the United States Patent and Trademark Office, and priority under 35 U.S.C. § 119 to Korean Patent Application No. 10-2017-0122879, filed on Sep. 22, 2017, in the Korean Intellectual Property Office, the disclosures of which are incorporated herein by reference in their entireties.

BACKGROUND

1. Field

The disclosure relates to a display apparatus and a method of operating the same, and more particularly, to a display apparatus capable of easily performing a channel switch, and a method of operating the display apparatus.

2. Related Art

Image display apparatuses display an image that can be viewed by users. Users can view a broadcast via an image display apparatus. Image display apparatuses display, on a display included therein, a broadcast selected by a user from among broadcasting signals transmitted by a broadcasting station. Many broadcasting stations from around the world have switched from analog broadcasting to digital broadcasting.

In digital broadcasting, a digital image signal and a digital audio signal are transmitted. When compared to analog broadcasting, digital broadcasting is resilient against external noise, has little data loss, is advantageous with respect to error correction, and provides high-resolution and high-definition screen images. In addition, digital broadcasting can provide a bidirectional service, unlike analog broadcasting.

Smart televisions (TVs) that provide various types of content in addition to a digital broadcasting function have been recently provided. Smart TVs aim to analyze and provide content desired by a user without manipulation by the user, instead of being manually operated according to a selection by the user.

To change a channel of broadcasting content output by a display apparatus, a channel up or down key of a remote controller is generally used. In this channel changing method, when a channel up or down key is input once, a current channel is sequentially changed to adjacent channels stored in a current channel map.

Examples of other methods for changing a channel include a method of directly inputting a channel number, and a method of displaying a channel list and selecting a channel from the channel list.

Moreover, even when broadcasting content is received from an external apparatus such as a set-top box, the above-described channel changing methods may be used, and a channel of the external apparatus, such as a set-top box, may be changed using an integrated remote controller.

Inputting a channel number to be switched, by using a numeric key, achieves a fast channel switch. However, to this end, a channel number should be memorized. Moreover, when many channels are stored in an image display apparatus, it takes long time to switch all channels.

SUMMARY

In accordance with an aspect of the disclosure, there is provided a display apparatus capable of easily performing a channel switch and a method of operating the display apparatus.

Additional aspects will be set forth in part in the description which follows and, in part, will be apparent from the description, or may be learned by practice of the presented embodiments.

In accordance with an aspect of the disclosure, there is provided a display apparatus including: a display; a memory configured to store at least one instruction; and a processor configured to execute the at least one instruction stored in the memory so as to: receive a channel control input; identify an image providing source of the display apparatus in response to recognizing the channel control input as a pre-designated input; generate a channel scroll user interface (UI) based on channel information corresponding to the image providing source of the display apparatus; and control the display to display the generated channel scroll UI. The channel scroll UI includes a plurality of channel items included in the channel information corresponding to the image providing source, and a current channel indicator indicating a current channel item from among the plurality of channel items, the current channel item corresponding to content currently displayed on the display apparatus.

The pre-designated input may include a long press in which a channel button of a remote control apparatus is selected for more than a predefined period of time.

The processor may be further configured to execute the at least one instruction to move the current channel indicator among the plurality of channel items included in the channel scroll UI according to a duration of the pre-designated input.

The processor may be further configured to execute the at least one instruction to: obtain the channel information based on a broadcasting signal when the image providing source of the display apparatus is a television (TV); and obtain the channel information based on an external image providing apparatus when the image providing source of the display apparatus is the external image providing apparatus.

The image providing source of the display apparatus may be the external image providing apparatus, and the processor may be further configured to execute the at least one instruction to identify the channel information from a portion of the content.

The image providing source of the display apparatus may be the external image providing apparatus, and the processor may be further configured to execute the at least one instruction to prohibit a channel control signal corresponding to the received channel control input from being transmitted to the external image providing apparatus.

The processor may be further configured to execute the at least one instruction to stop movement of the current channel indicator among the plurality of channel items included in the channel scroll UI in response to detection of an input corresponding to release of the pre-designated input.

The processor may be further configured to execute the at least one instruction to display content corresponding to a subsequently selected current channel item indicated by the current channel indicator on the display in response to a specific event, and the specific event may include a user input of selecting the subsequently selected current channel item or a lapse of a predefined period of time after the input corresponding to the release of the pre-designated input is detected.

In accordance with another aspect of the disclosure, there is provided a method of operating a display apparatus, the method including: receiving a channel control input; identifying an image providing source of the display apparatus in response to recognizing the channel control input as a pre-designated input; generating a channel scroll user interface (UI) based on channel information corresponding to the image providing source of the display apparatus; and displaying the generated channel scroll UI. The channel scroll UI includes a plurality of channel items included in the channel information corresponding to the image providing source, and a current channel indicator indicating a current channel item from among the plurality of channel items, the current channel item corresponding to content currently displayed on the display apparatus.

The pre-designated input may include a long press in which a channel button of a remote control apparatus is selected for more than a predefined period of time.

The method may further include moving the current channel indicator among the plurality of channel items included in the channel scroll UI according to a duration of the pre-designated input.

The may further include: obtaining the channel information based on a broadcasting signal when the image providing source of the display apparatus is a television (TV); and obtaining the channel information based on an external image providing apparatus when the image providing source of the display apparatus is the external image providing apparatus.

The image providing source of the display apparatus may be the external image providing apparatus, and the method may further include identifying the channel information from a portion of the content.

The image providing source of the display apparatus may be the external image providing apparatus, and the method may further include prohibiting a channel control signal corresponding to the received channel control input from being transmitted to the external image providing apparatus.

The method may further include stopping movement of the current channel indicator between the plurality of channel items included in the channel scroll UI, in response to detection of an input corresponding to release of the pre-designated input, and displaying the current channel indicator to a channel item.

The method may further include displaying content corresponding to a subsequently selected current channel item indicated by the current channel indicator on the display, in response to a specific event, and the specific event may include a user input of selecting the subsequently selected current channel item or a lapse of a predefined period of time after the input corresponding to the release of the pre-designated input is detected.

In accordance with yet another aspect of the disclosure, there is provided a non-transitory computer-readable recording medium having recorded thereon a computer program, which, when executed by a computer, performs a method of operating a display apparatus, the method including: receiving a channel control input; identifying an image providing source of the display apparatus in response to recognizing the channel control input as a pre-designated input; generating a channel scroll user interface (UI) based on channel information corresponding to the image providing source of the display apparatus; and displaying the generated channel scroll UI. The channel scroll UI includes a plurality of channel items included in the channel information corresponding to the image providing source, and a current channel indicator indicating a current channel item from among the plurality of channel items, the current channel item corresponding to content currently displayed on the display apparatus.

BRIEF DESCRIPTION OF THE DRAWINGS

The above and other aspects, features and advantages of certain embodiments of the disclosure will be more apparent from the following description taken in conjunction with the accompanying drawings, in which.

DETAILED DESCRIPTION

Figure 1:
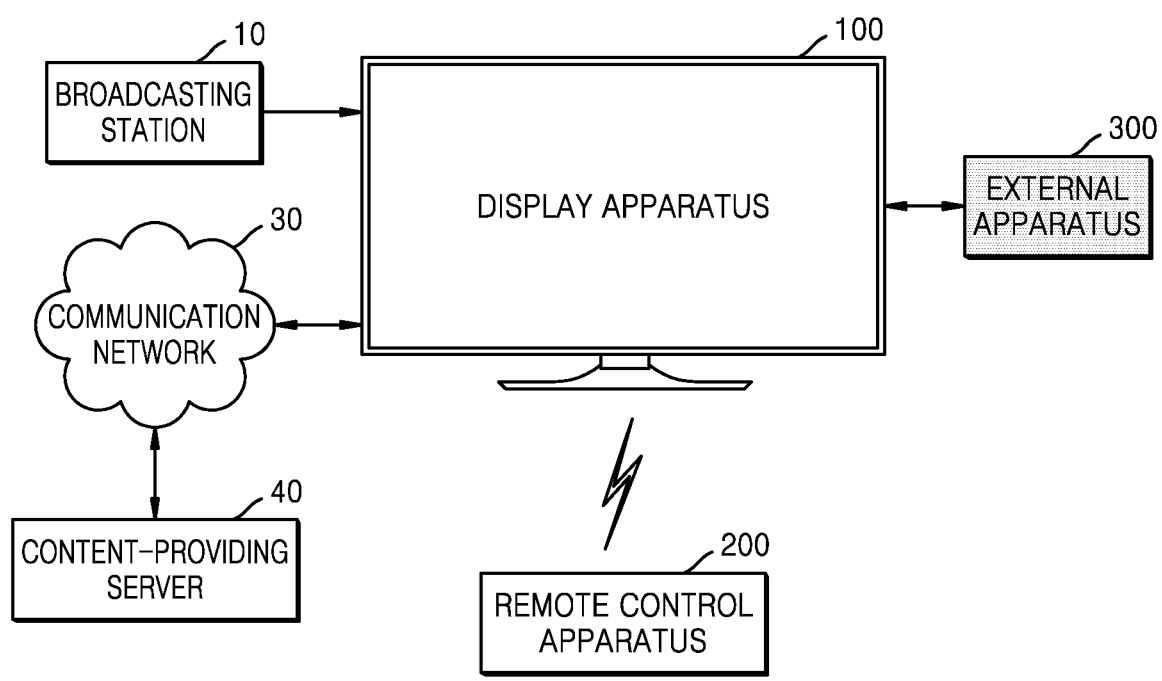
FIG. 1 is a schematic diagram of a system according to an embodiment.

Hereinafter, terms used in the specification will be briefly described, and then the present disclosure will be described in detail.

Although general terms widely used at present were selected for describing the present disclosure in consideration of the functions thereof, these general terms may vary according to intentions of one of ordinary skill in the art, case precedents, the advent of new technologies, and the like. Terms arbitrarily selected by the applicant of the present disclosure may also be used in a specific case. In this case, their meanings need to be given in the detailed description of the disclosure. Hence, the terms must be defined based on their meanings and the contents of the entire specification, not by simply stating the terms.

The terms "comprises" and/or "comprising" or "includes" and/or "including" when used in this specification, specify the presence of stated elements, but do not preclude the presence or addition of one or more other elements. The terms " . . . unit" and " . . . module" when used in this specification refers to a unit in which at least one function or In operation is performed, and may be implemented as hardware, software, or a combination of hardware and software.

Embodiments are described in detail herein with reference to the accompanying drawings so that this disclosure may be easily performed by one of ordinary skill in the art to which the present disclosure pertain. The present disclosure may, however, be embodied in many different forms and should not be construed as being limited to the embodiments set forth herein. In the drawings, parts irrelevant to the description are omitted for simplicity of explanation, and like numbers refer to like elements throughout.

The term "user" used herein denotes a person who controls a function or operation of an image display apparatus by using a control apparatus. Examples of the user may include a viewer, a manager, or an installation engineer.

FIG. 1 is a schematic diagram of a system according to an embodiment.

Referring to FIG. 1, the system includes a display apparatus 100, a remote control apparatus 200, an external apparatus 300, a broadcasting station 10, a communication network 30, and a content-providing server 40.

The display apparatus 100 may process content data received via various sources and may display an image. The sources via which the display apparatus 100 receives the content data may include the broadcasting station 10, the content-providing server 40, and the external apparatus 300.

The display apparatus 100 may receive a radio frequency (RF) signal from the broadcasting station 10 by using an RF antenna.

The display apparatus 100 may receive content from the content-providing server 40 via the communication network 30, based on an Internet protocol.

The display apparatus 100 may receive content from the external apparatus 300 connected to the display apparatus 100 via a wired interface, such as various ports or a High-Definition Multimedia Interface (HDMI), or a wireless interface, such as Wi-Fi, Wi-Fi direct, or Bluetooth. Examples of the external apparatus 300 may include a set-top box, a game player, a blu-ray disc (BD) player, a personal computer (PC), a universal serial bus (USB), and a mobile phone. For example, a set-top box is connected to the display apparatus 100 by wire or wirelessly, and processes an image signal received from an external source and outputs the processed image signal to the display apparatus 100.

The display apparatus 100 may also receive content from a mobile device to which the display apparatus 100 is communicably connected, and may obtain content data from a memory embedded in the display apparatus 100 or a memory to which the display apparatus 100 is locally connected.

According to the present embodiment, the display apparatus 100 may select one from among various image providing sources as described above and may process content data received from the selected image providing source to thereby display a content image. The display apparatus 100 may provide various user interface (UI) environments enabling a user to select one from among various image providing sources, and an example of a UI environment is the remote control apparatus 200.

The remote control apparatus 200 is basically implemented using a device physically separated and spaced apart from the display apparatus 100 and is provided to be easily held and carried by a user. The remote control apparatus 200 may be a remote control apparatus designed and manufactured to correspond to the display apparatus 100 while the display apparatus 100 is being manufactured, or may be a general-use remote control apparatus.

In order for the remote control apparatus 200 to control an operation of the display apparatus 100 according to a user's manipulation, the display apparatus 100 needs to recognize a control signal transmitted by the remote control apparatus 200. Accordingly, information of each operation of the display apparatus 100 corresponding to the control signal transmitted by the remote control apparatus 200 is previously prescribed. This information is referred to as a code set. The code set needs to be installed or stored in each of the remote control apparatus 200 and the display apparatus 100 before the remote control apparatus 200 controls the display apparatus 100. However, there are other cases than the case where the remote control apparatus 200 is designed and manufactured to correspond to the display apparatus 100 while the display apparatus 100 is being manufactured. The remote control apparatus 200 may be an input device manufactured by a different manufacturing company from the manufacturing company of the display apparatus 100. However, a code set for controlling the display apparatus 100 may be installed in the remote control apparatus 200 later, such that the remote control apparatus 200 may be able to control the display apparatus 100. Likewise, in order for the remote control apparatus 200 to control a set-top box, a code set for controlling the set-top box may be stored in the remote control apparatus 200. The remote control apparatus 200 may be any of various types of devices for controlling the display apparatus 100, such as a remote controller or a mobile phone.

The display apparatus 100 according to an embodiment may be a TV, but this is merely an embodiment. The display apparatus 100 may be implemented as an electronic device including a display. For example, the display apparatus 100 may be any type of electronic device, such as a mobile phone, a tablet PC, a digital camera, a camcorder, a laptop computer, a desktop computer, an e-book terminal, a digital broadcast terminal, a personal digital assistant (PDA), a portable multimedia player (PMP), a navigation device, an MP3 player, or a wearable device.

The display apparatus 100 may receive a broadcasting signal to which a channel is allocated for each frequency, from transmission equipment of a broadcasting station via an RF antenna or a cable. The display apparatus 100 may also receive various pieces of content, such as a streaming service, a web service, a game service, and a social network service, based on an Internet protocol. A channel number may be assigned to each of a plurality of pieces of content provided based on an Internet protocol, such as IP streaming, an application, or a web page. A service enabling a user to access and immediately view content via the same experience as that in the case of a general broadcasting channel, such as an electronic program guide (EPG), a channel list, channel up and down, or a channel number input, by assigning respective channel numbers to pieces of content provided based on an Internet protocol as described above, is referred to as a virtual channel service.

To change a channel of broadcasting content output by the display apparatus 100, a method of using a channel up or down key of a remote controller is generally used. In this channel changing method, when a channel up or down key is input once, a display apparatus sequentially changes a channel of displayed content to previous or next channels stored in a current channel map. Examples of other methods for changing a channel include a method of directly inputting a channel number and a method of displaying a channel list and selecting a channel from the channel list. Moreover, even when the display apparatus receives broadcasting content from an external apparatus such as a set-top box, the display apparatus may change a channel of the external apparatus, such as a set-top box, by using the above-described channel changing methods.

However, when there are a large number of channels, it is not easy to provide a fast channel switch by using the method of switching a channel via a channel up/down button or memorizing a channel number and directly inputting the memorized channel number.

According to the present embodiment, the display apparatus 100 may provide a UI including a channel list that may be scrolled to fast switch between channels.

According to the present embodiment, the display apparatus 100 may provide a UI including a scrollable channel list no matter whether an image providing source is a TV broadcasting channel or an external apparatus connected to the display apparatus 100. For example, when the image providing source is a TV broadcasting channel, the display apparatus 100 may display a channel scroll UI by using a channel map based on channel guide information corresponding to the TV broadcasting channel. For example, when the image providing source is an external image providing apparatus such as a set-top box, the display apparatus 100 may obtain a channel map provided by the external image providing apparatus and may display a channel scroll UI by using the channel map.

Figure 2:
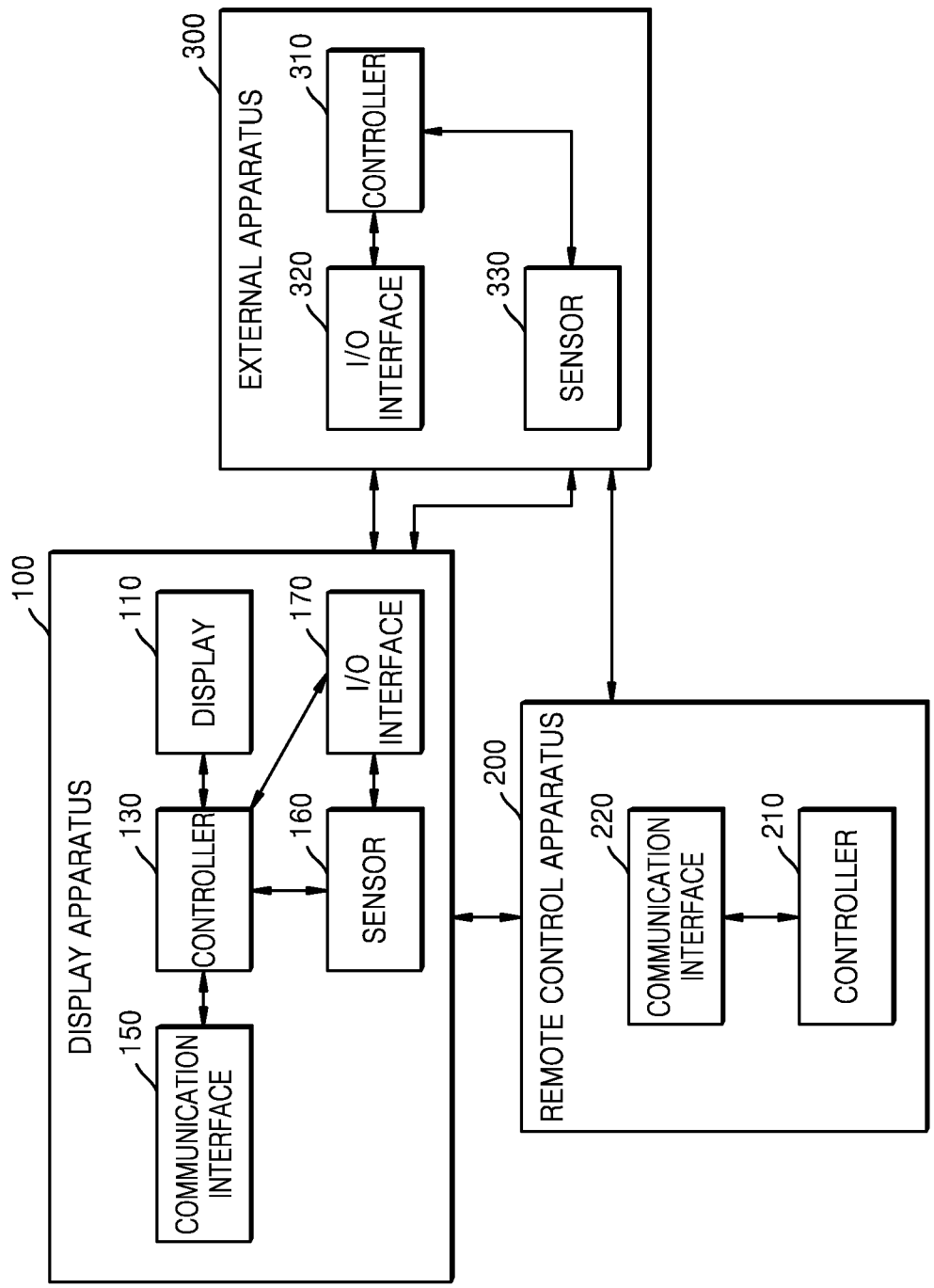
FIG. 2 is a block diagram for schematically explaining operations between a display apparatus, an external apparatus, and a remote control apparatus, according to an embodiment.

FIG. 2 is a block diagram for schematically explaining operations between the display apparatus 100, the external apparatus 300, and the remote control apparatus 200 according to an embodiment.

Referring to FIG. 2, the display apparatus 100 includes a display 110, a controller 130, a communication interface 150, a sensor 160, and an input/output (I/O) interface 170.

The display 110 may display content received from the external apparatus 300 via the I/O interface 170 or content received via the communication interface 150.

The communication interface 150 enables the display apparatus 100 to communicate with an external server. In particular, the communication interface 150 may receive a channel map of the external apparatus 300 connected to the display apparatus 100 from the external server. The channel map received from the external server may be stored in a memory of the display apparatus 100.

The I/O interface 170 receives content from the external apparatus 300.

The sensor 160 senses a command or a control signal provided by the remote control apparatus 200 and transmits the sensed command or the sensed control signal to the controller 130.

The controller 130 controls all of the components of the display apparatus 100 and may include at least one processor.

According to an embodiment, the controller 130 may receive a channel control input, identify an image providing source of the display apparatus 100 in response to the channel control input recognized as a pre-designated input, generate a channel scroll UI based on channel information corresponding to the image providing source of the display apparatus 100, and control the display 110 to display the generated channel scroll UI. The channel scroll UI may include a plurality of channel items included in the channel information corresponding to the image providing source, and a current channel indicator indicating a current channel item corresponding to content currently displayed on the display apparatus 100 may be displayed on one of the channel items.

According to an embodiment, the pre-designated input may include a long press in which the channel up/down button of the remote control apparatus 200 is pressed for more than a predefined period of time.

According to an embodiment, by executing at least one instruction, the controller 130 may move the current channel indicator between the plurality of channel items included in the channel scroll UI according to a duration of a long press signal.

According to an embodiment, when an image providing source of the display apparatus 100 is a TV, the controller 130 may generate the channel scroll UI based on program information corresponding to a broadcasting signal, and, when the image providing source of the display apparatus 100 is an external image providing apparatus, the controller 130 may generate the channel scroll UI based on channel information corresponding to the external image providing apparatus.

According to an embodiment, when the image providing source of the display apparatus 100 is an external image providing apparatus, the controller 130 may identify channel information about content currently displayed on the display apparatus 100 from a part of the area of the content in order to obtain a current channel corresponding to the content.

According to an embodiment, when the image providing source of the display apparatus 100 is an external image providing apparatus, the controller 130 may prohibit a channel control signal corresponding to the received channel control input from being transmitted to the external image providing apparatus.

According to an embodiment, the controller 130 may stop movement of the current channel indicator between the plurality of channel items included in the channel scroll UI, in response to detection of an input corresponding to release of the pre-designated input, and may display the current channel indicator to a channel item.

According to an embodiment, in response to a specific event, the controller 130 may switch the currently displayed content to content corresponding to a current channel item indicated by the current channel indicator and display the switched-to content on the display 110. The specific event may include a user input of selecting the current channel item or a lapse of a predefined period of time after the release input is detected.

The external apparatus 300 includes a controller 310, an I/O interface 320, and a sensor 330.

The controller 310 controls all of the components of the external apparatus 300 and may include at least one processor.

When the controller 310 of the external apparatus 300 receives a channel control code signal from the display apparatus 100 or the remote control apparatus 200, the controller 310 controls a channel provided by the external apparatus 300 according to the received channel control code signal and transmits content according to the channel control to the display apparatus 100 via the I/O interface 320.

When the controller 310 provides the content to the display apparatus 100, the controller 310 may add channel information corresponding to the content to a predetermined area of the content.

The I/O interface 320 transmits the content to the display apparatus 100 under the control of the controller 310.

The sensor 330 senses the channel control code signal received from the display apparatus 100 or the remote control apparatus 200 and transmits the sensed channel control code signal to the controller 310. For example, the sensor 330 may sense a channel control infrared (IR) signal from an IR (Infrared) blaster or the like connected to the display apparatus 100 or may sense a channel control IR signal from the remote control apparatus 200 that received the channel control code signal from the display apparatus 100.

The remote control apparatus 200 includes a controller 210 and a communication interface 220.

The controller 210 controls the components of the remote control apparatus 200 and may include at least one processor.

The controller 210 of the remote control apparatus 200 may receive a user input, for example, pressing of a channel up button or pressing of a channel down button, via an input interface, and transmit a command corresponding to the received user input, for example, a channel switch command, to the display apparatus 100 via an infrared irradiator or the like.

The communication interface 220 may receive a channel control code signal from the display apparatus 200.

The controller 210 may control the infrared irradiator to transmit a channel control IR signal corresponding to the channel control code signal received from the display apparatus 100 to the external apparatus 300.

Figure 3:
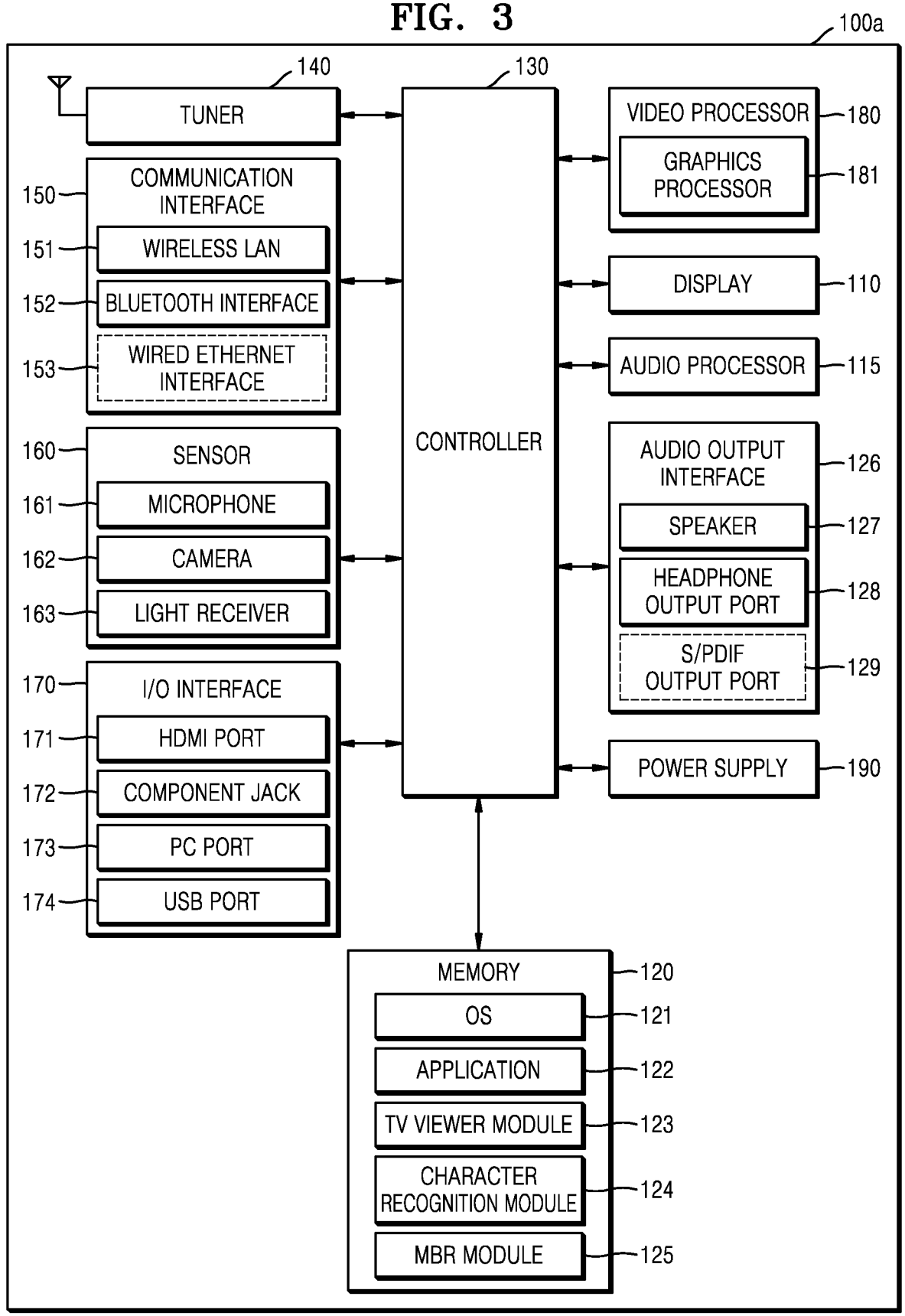
FIG. 3 is a block diagram of a detailed structure of a display apparatus, according to an embodiment.

FIG. 3 is a block diagram of a detailed structure of a display apparatus 100a according to an embodiment. The display apparatus 100a of FIG. 3 may be an embodiment of the display apparatus 100 of FIG. 1.

Referring to FIG. 3, the display apparatus 100a may further include a video processor 180, an audio processor 115, an audio output interface 126, a power supply 190, a tuner 140, and a memory 120, in addition to the communication interface 150, the I/O interface 170, the controller 130, the display 110, and the sensor 160.

The video processor 180 processes video data that is received by the display apparatus 100a. The video processor 180 may perform a variety of image processing, such as decoding, scaling, noise filtering, frame rate transformation, and resolution transformation, on the received video data.

A graphics processor 181 generates a screen image including various objects, such as an icon, an image, and a text, by using an arithmetic unit and a rendering unit. The arithmetic unit calculates attribute values, such as a coordinate value, a shape, a size, a color, and the like, with which each object is to be displayed according to layouts of the screen image, based on a user input sensed by the sensor 160. The rendering unit generates screen images of various layouts including objects, based on the attribute values calculated by the arithmetic unit. The screen images generated by the rendering unit are displayed on a display area of the display 110.

According to an embodiment, the video processor 180 may extract information about a channel corresponding to content provided by the external apparatus 300 via the rendering unit by using optical character recognition (OCR) from a predetermined area of an image of the content.

According to an embodiment, the video processor 180 may generate a channel scroll UI by using a channel map corresponding to a TV broadcasting program or a channel map corresponding to content provided by an external image providing apparatus, and may process a current channel indicator such that the current channel indicator may move between channel items of the channel scroll UI during a long press.

The display 110 displays video included in a broadcasting signal received via the tuner 140 on the screen thereof, under the control of the controller 130. The display 110 may also display content (for example, a moving picture) that is input via the communication interface 150 or the I/O interface 170. The display 110 may output an image stored in the memory 120 under the control of the controller 130.

The display 110 may generate a driving signal by converting an image signal, a data signal, an on-screen display (OSD) signal, and a control signal that are processed by the controller 130. The display 110 may be a plasma display panel (PDP), a liquid-crystal display (LCD), an organic light-emitting device (OLED), a flexible display, or a three-dimensional (3D) display. The display 110 may be configured as a touch screen, and thus may serve as an input device as well as an output device.

The audio processor 115 processes audio data. The audio processor 115 may perform a variety of processing, such as decoding, amplification, or noise filtering, on the audio data. The audio processor 115 may include a plurality of audio processing modules to process audios corresponding to a plurality of pieces of content.

The audio output interface 126 outputs audio included in a broadcasting signal received via the tuner 140, under the control of the controller 130. The audio output interface 126 may also output audio (for example, a voice or a sound) that is input via the communication interface 150 or the I/O interface 170. The audio output interface 126 may also output audio stored in the memory 120 under the control of the controller 130. The audio output interface 126 may include at least one selected from a speaker 127, a headphone output port 128, and a Sony/Philips Digital Interface (S/PDIF) output port 129. The audio output interface 126 may include a combination of the speaker 127, the headphone output port 128, and the S/PDIF output port 129.

The tuner 140 may tune and select only a frequency of a channel which the display apparatus 100a wants to receive from among many radio wave components that are obtained via amplification, mixing, resonance, or the like of a wired or wireless broadcasting signal. The broadcasting signal includes audio, video, and additional information (for example, an EPG).

The tuner 140 may receive a broadcasting signal in a frequency band corresponding to a channel signal according to a user input (for example, a control signal received from the remote control apparatus 200, for example, a channel number input, a channel up-down input, and a channel input on an EPG screen image).

The tuner 140 may receive a broadcasting signal from various sources, such as terrestrial broadcasting, cable broadcasting, satellite broadcasting, and Internet broadcasting. The tuner 140 may also receive a broadcasting signal from a source such as analog broadcasting or digital broadcasting. The broadcasting signal received via the tuner 140 is decoded (for example, audio decoding, video decoding, or additional information decoding) and is thus divided into audio, video, and/or additional information. The audio, the video, and/or the additional information may be stored in the memory 120 under the control of the controller 130.

The display apparatus 100a may include a single tuner 140 or a plurality of tuners 140. The tuner 140 may be all-in-one with the display apparatus 100a, or implemented as a separate apparatus (for example, a tuner that is connected to a set-top box and the I/O interface 170) having a tuner that is electrically connected to the display apparatus 100a.

The communication interface 150 may connect the display apparatus 100a to an external apparatus (for example, an audio apparatus) under the control of the controller 130. The controller 130 may transmit/receive content to/from the external apparatus connected via the communication interface 150, download an application from the external apparatus, or perform web-browsing. The communication interface 150 may include a wireless local area network (LAN) interface 151, a Bluetooth network interface 152, or a wired Ethernet network interface 153 in correspondence to a performance and a structure of the display apparatus 100a. The communication interface 150 may include a combination of the wireless LAN interface 151, the Bluetooth network interface 152, and the wired Ethernet network interface 153. The communication interface 150 may receive a control signal of the control apparatus 30 under the control of the controller 130. The control signal may be implemented as a Bluetooth signal, an RF signal, or a Wi-Fi signal.

The communication interface 150 may further include short-range communication (for example, near field communication (NFC) or Bluetooth low energy (BLE)), in addition to the Bluetooth network 152.

According to an embodiment, the communication interface 150 may receive content corresponding to a virtual channel from a content-providing server.

The sensor 160 senses a voice of a user, an image of the user, or an interaction with the user, and may include a microphone 161, a camera 162, and a light receiver 163.

The microphone 161 receives an uttered voice of the user. The microphone 161 may transform the received voice into an electrical signal and output the electrical signal to the controller 130. The user voice may include, for example, a voice corresponding to a menu or function of the display apparatus 100a.

The camera 162 may receive an image (for example, consecutive frames) corresponding to a motion of the user including a gesture within a recognition range of the camera 162. The controller 130 may select a menu that is displayed on the display apparatus 100a by using a result of the recognition of the received motion, or perform control corresponding to the result of the motion recognition.

The light receiver 163 receives an optical signal (including a control signal) from the remote control apparatus 200 outside the display apparatus 100a. The light receiver 163 may receive an optical signal corresponding to a user input (for example, touch, pressing, a touch gesture, a voice, or a motion) from the remote control apparatus 200. A control signal may be extracted from the received optical signal under the control of the controller 130. For example, the light receiver 163 may receive a control signal corresponding to a channel up/down button for channel switching from the remote control apparatus 200.

The I/O interface 170 receives video (for example, a moving picture), audio (for example, a voice or music), and additional information (for example, an EPG) from outside the display apparatus 100a under the control of the controller 130. The I/O interface 170 may include an HDMI port 171, a component jack 172, a PC port 173, or a USB port 174. The I/O interface 170 may include a combination of the HDMI port 171, the component jack 172, the PC port 173, and the USB port 174. The external apparatus 300 may be connected to the display apparatus 100a via the HDMI port 171.

The memory 120 may store various data, programs, or applications for driving and controlling the display apparatus 100a under the control of the controller 130. The memory 120 may store input/output signals or data corresponding to driving of the video processor 180, the display 110, the audio processor 115, the audio output interface 126, the power supply 190, the tuner 140, the communication interface 150, the sensor 160, and the I/O interface 170.

The memory 120 may store an operating system (OS) 121 for controlling the display apparatus 100a and the controller 130, an application 122 initially provided by a manufacturer or downloaded from outside the display apparatus 100a, a graphical user interface (GUI) associated with the application 122, objects (for example, an image text, an icon, and a button) for providing the GUI, user information, a document, databases, or related pieces of data.

In particular, according to an embodiment, the memory 120 include a TV viewer module 123 including at least one instruction for receiving an input signal from the remote control apparatus 200 and accordingly simply performing a channel control corresponding to the input signal or entering a channel scroll UI mode when the input signal corresponds to a pre-designated input, a character recognition module 124 including at least one instruction for recognizing channel information from content received from the external apparatus 300, and an MBR (Multibrand remote control) module 125 including at least one instruction for a channel control from the external apparatus 300.

Figure 10:
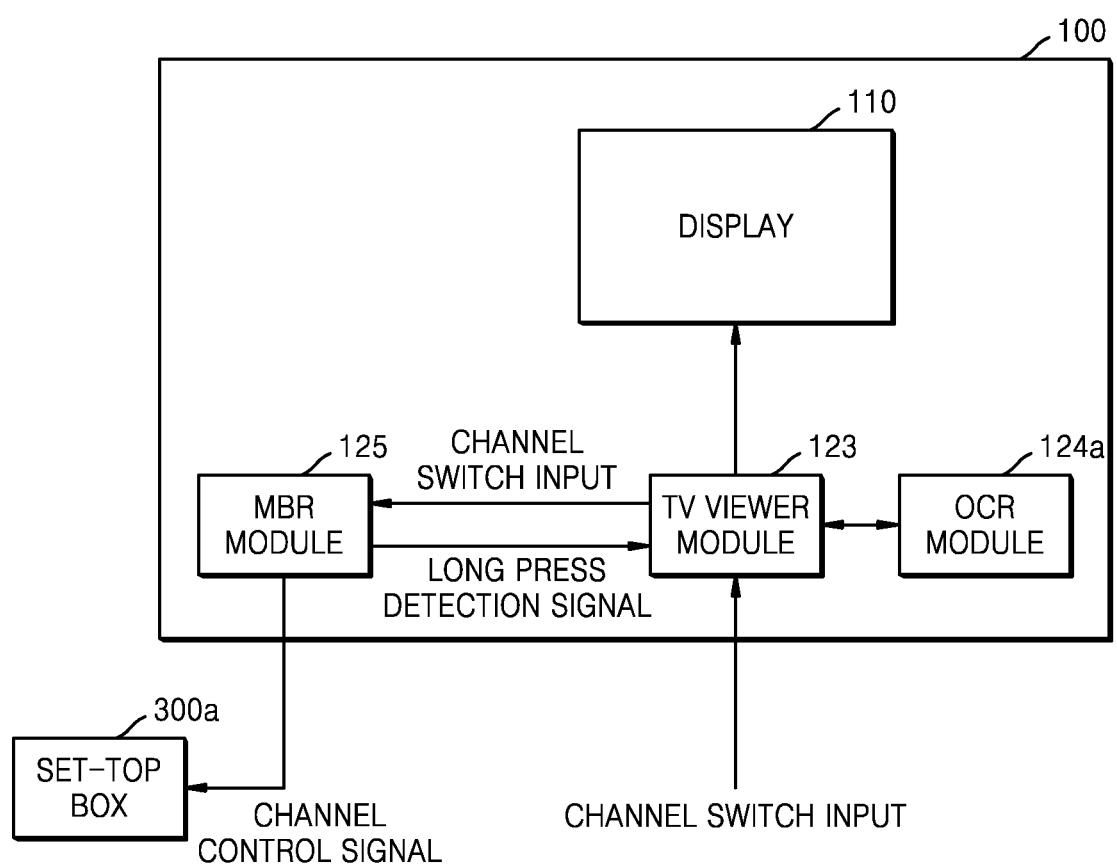
FIG. 10 is a block diagram of a display apparatus according to an embodiment.

The character recognition module 124 may include, for example, an OCR module 124a of FIG. 10. To recognize content output to a screen via a set-top box, the OCR module 124a performs OCR based on pre-stored OCR area information to thereby determine what a current channel is. The OCR area information may differ according to broadcasting providers and may be received from a server.

The memory 120 may also store a channel map. The channel map may include a channel map extracted from an EPG corresponding to a TV broadcasting signal, or, when the display apparatus 100a is connected to an external image providing apparatus, may include a channel map corresponding to content provided by the external image providing apparatus. The controller 130 secures broadcasting provider information of a set-top box connected to an external apparatus of the display apparatus 100a, based on information input by a user with respect to the set-top box, and is connected to a server run by the set-top box provider or another server to thereby bring meta data about the entire channel map based on the secured broadcasting provider information of the set-top box. A channel number, a channel name, a channel identifier (ID), a channel logo, and the like of each channel may be extracted from the meta data and may be stored as a database in the channel map of the memory 120.

The memory 120 includes a read-only memory (ROM), a random-access memory (RAM), or a memory card (e.g., a micro SD card or a USB memory) mounted in the display apparatus 100a. The memory 120 may include a non-volatile memory, a volatile memory, a hard disk drive (HDD), or a solid state drive (SSD).

The controller 130 controls an overall operation of the display apparatus 100a and signal transfer among the internal components of the display apparatus 100a and processes data. When there is an input of a user or stored preset conditions are satisfied, the controller 130 may execute an OS and various applications that are stored in the memory 120.

The controller 130 may include a RAM that stores a signal or data input by an external source of the display apparatus 100a or is used as a memory area for various operations performed by the display apparatus 100a, a ROM that stores a control program for controlling the display apparatus 100a, and a processor.

The processor used in the controller 130 may include a graphics processing unit (GPU) for performing video graphics processing. The processor may be implemented by using a System On Chip (SoC) into which a core and a GPU are incorporated. The processor may include a single core, a dual core, a triple core, a quad core, or a multiple core thereof.

The processor may include a plurality of processors. For example, the processor may be implemented by using a main processor and a sub-processor operating in a sleep mode.

By executing at least one instruction stored in the memory 120, the controller 130 according to an embodiment may store a channel map corresponding to a broadcasting signal or a channel map corresponding to an external image providing apparatus such as a set-top box.

By executing at least one instruction stored in the memory 120, the controller 130 according to an embodiment may determine whether an operation corresponding to an input received from a remote control apparatus is to be performed in a TV or the external image providing apparatus and, when the operation corresponding to the input received from the remote control apparatus is to be performed in the external image providing apparatus, send a control signal to the external image providing apparatus by using an IR blaster or the like.

By executing at least one instruction stored in the memory 120, the controller 130 according to an embodiment may perform OCR based on pre-stored OCR area information and thus determine what a current channel is, in order to recognize channel information of content received from the external image providing apparatus.

By executing at least one instruction stored in the memory 120, when a signal received from the remote control apparatus is determined to be a long press, the controller 130 according to an embodiment may display a channel scroll UI based on a channel map stored in the memory 120 and may move a channel indicator upwards or downwards on the channel scroll UI until a release key is sensed. When the release key is sensed, the controller 130 may stop scrolling the channel indicator, enter a detailed manipulation mode, operate with a short press on the channel scroll UI, and may move the channel indicator one channel at a time upwards or downwards. When a long press is input in the detailed manipulation mode, the channel indicator moves again upwards or downwards.

By executing at least one instruction stored in the memory 120, when the controller 130 according to an embodiment may control the IR blaster to transmit control information received from a remote controller to a connected set-top box when the controller 130 is unable to secure channel information about the set-top box, such as when the controller 130 is unable to ascertain a broadcasting provider of the set-top box, when trying to enter a channel scroll UI mode. In other words, when there is no channel information about the set-top box in a situation where a channel up key is continuously received, the controller 130 does not perform an operation corresponding to a channel UP and may control the IR blaster to continuously emit an IR code enabling the set-top box to perform a channel UP.

The display apparatus 100a having the display 110 may be electrically connected to an external apparatus (for example, a set-top box) having a tuner. For example, the display apparatus 100a may be implemented by using an analog TV, a digital TV, a 3D TV, a smart TV, an LED TV, an OLED TV, a plasma TV, a monitor, or the like, but it will be easily understood by one of ordinary skill in the art to which the present disclosure pertains that embodiments of the present disclosure are not limited thereto.

The block diagram of the display apparatus 100a illustrated in FIG. 3 is for an embodiment. Components illustrated in the block diagram of FIG. 3 may be combined or omitted according to specifications of the display apparatus 100a when being actually implemented, or additional components may be included in the block diagram of FIG. 3. In other words, two or more components may be combined into a single component, or a single component may be divided into two or more components. A function performed in each block is merely an example to explain embodiments, and a detailed operation or device of each block does not limit the scope of the embodiments.

Figure 4:
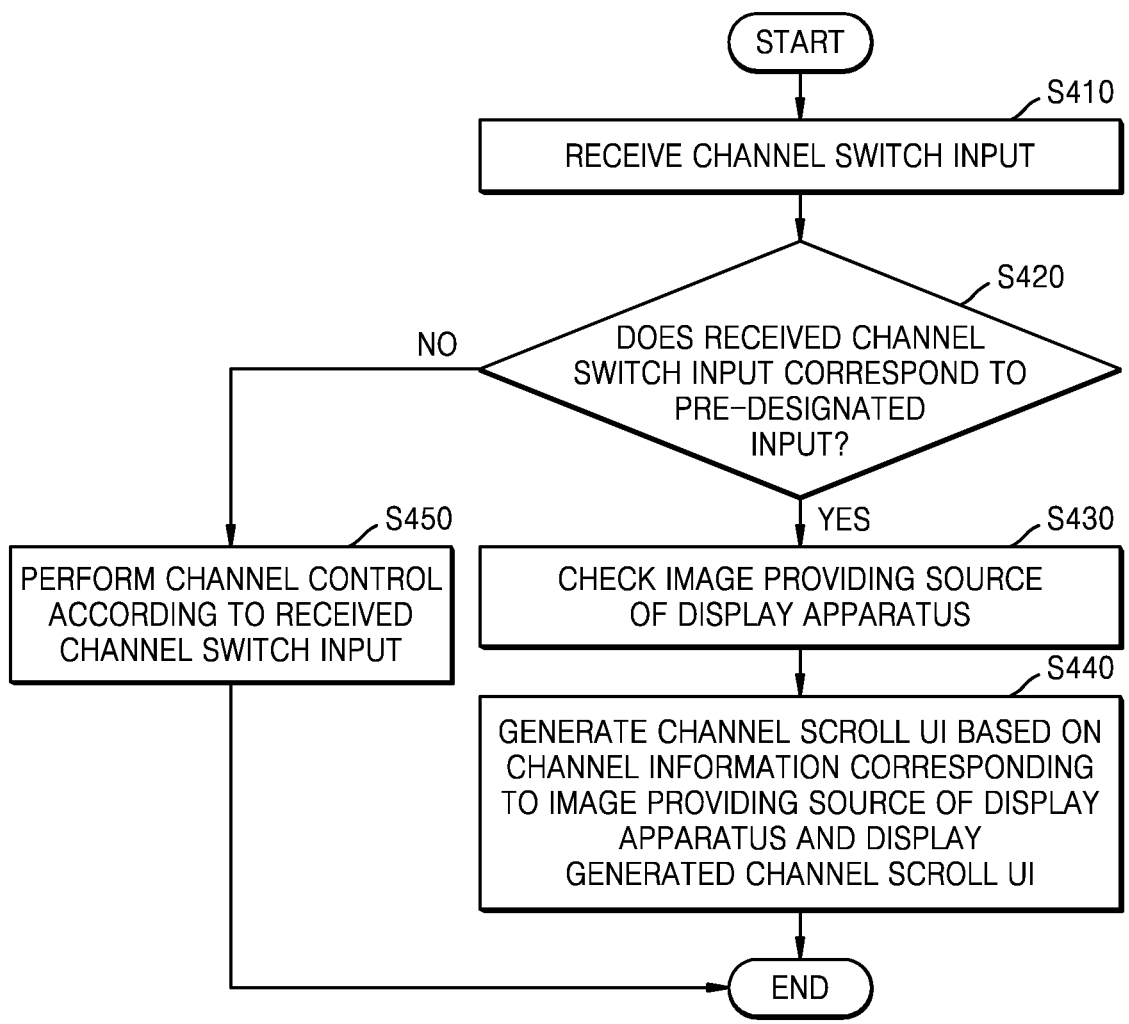
FIG. 4 is a flowchart of a method of operating a display apparatus, according to an embodiment.

FIG. 4 is a flowchart of a method of operating a display apparatus, according to an embodiment.

Referring to FIG. 4, in operation S410, the display apparatus 100 receives a channel switch input.

For example, when a user presses a channel up button or a channel down button included in a remote control apparatus, the remote control apparatus may transmit to the display apparatus 100 a signal indicating that the channel up button has been pressed or a signal indicating that the channel down button has been pressed, and the display apparatus 100 may receive, as a channel switch input, such a channel up button press signal, such a channel down button press signal, or a signal indicating pressing of the channel up button/channel down button using a specific method.

In operation S420, the display apparatus 100 determines whether the received channel switch input corresponds to a pre-designated input.

The display apparatus 100 may recognize a received channel switch input signal and determine whether the recognized channel switch input signal corresponds to the pre-designated input. For example, the pre-designated input may include a long press signal indicating that the channel up button or the channel down button is being pressed for more than a predefined period of time. However, the pre-designated input is not limited to the long press signal, and may be any input as long as it may be generated via manipulation of one button or a plurality of buttons included in the remote control apparatus.

In operation S430, when the received channel switch input corresponds to the pre-designated input, the display apparatus 100 checks an image providing source of the display apparatus 100.

When the display apparatus 100 determines that the received channel switch input corresponds to the pre-designated input, the display apparatus 100 may determine what the image providing source of the display apparatus 100 is. Examples of the image providing source of the display apparatus 100 may include a TV source and an external apparatus source.

In operation S440, the display apparatus 100 generates a channel scroll UI, based on channel information corresponding to the image providing source of the display apparatus 100, and displays the generated channel scroll UI.

When the checked image providing source is a TV source, the display apparatus 100 may generate the channel scroll UI based on TV channel information and may display the generated channel scroll UI on a display. The display apparatus 100 may obtain the TV channel information from a broadcasting signal received by the display apparatus 100. For example, the display apparatus 100 may generate a channel scroll UI based on EPG information extracted from a broadcasting signal received from a tuner, and may display the generated channel scroll UI. When the checked image providing source is an external apparatus source, for example, a set-top box, the display apparatus 100 may generate a channel scroll UI based on set-top box channel information and may display the generated channel scroll UI on the display. The display apparatus 100 may obtain the set-top box channel information from the set-top box or a server of a set-top box manufacturer.

In operation S450, when the received channel switch input does not correspond to the pre-designated input, the display apparatus 100 performs a channel control according to the received channel switch input.

For example, when the received channel switch input does not correspond to the pre-designated input, the display apparatus 100 performs a control corresponding to the received channel switch input. For example, when the received channel switch input is a channel up button press signal, the display apparatus 100 may move a current channel to a next channel and display the next channel content, and, when the channel switch input is a channel down button press signal, the display apparatus 100 may move the current channel to a previous channel and display the previous channel content.

Figure 5:
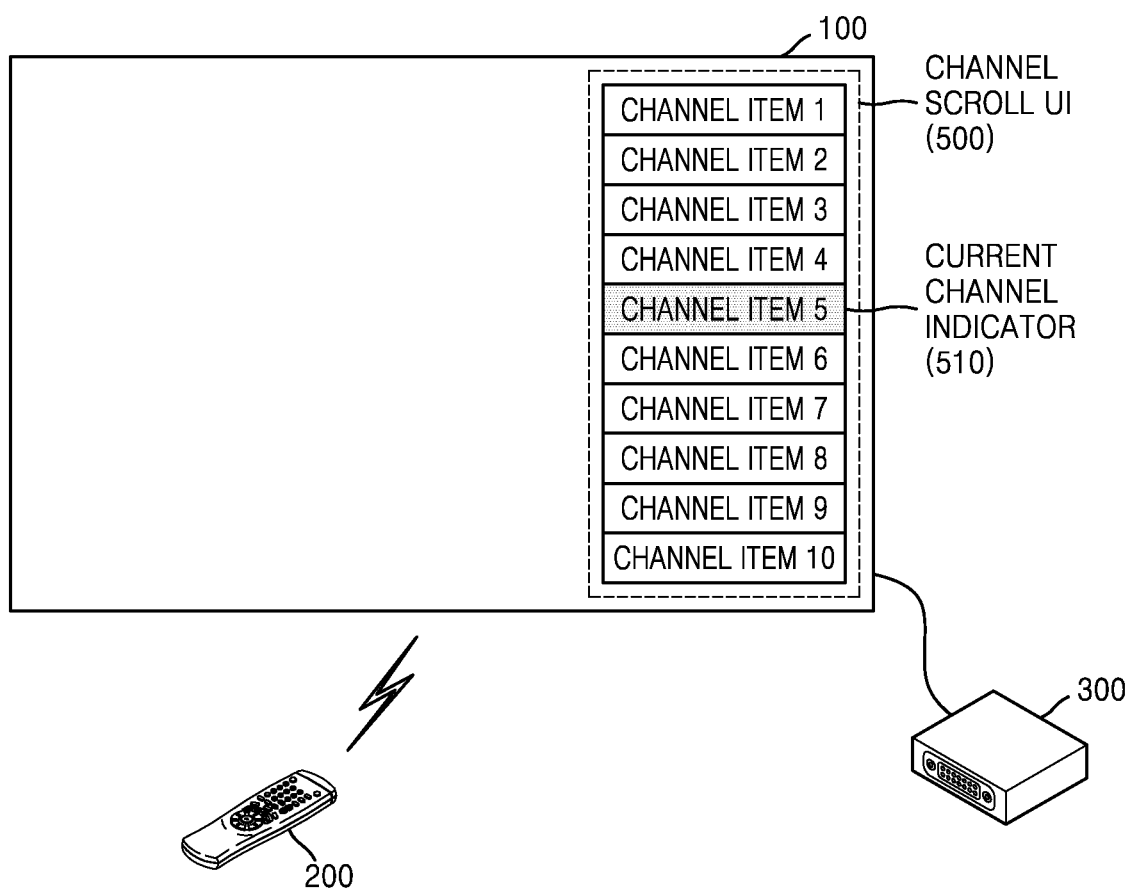
FIG. 5 is a schematic diagram illustrating a channel scroll user interface (UI) displayed on a display apparatus, according to an embodiment.

FIG. 5 is a schematic diagram illustrating a channel scroll UI 500 displayed on the display apparatus 100, according to an embodiment.

Referring to FIG. 5, the channel scroll UI 500 displayed on the display apparatus 100 may include a plurality of channel items. Each channel item is information for identifying a channel, and may include a channel number, a channel ID, a thumbnail image of content corresponding to the channel, and the like. The display apparatus 100 may display a current channel indicator 510 on a channel item indicating a current channel from among the channel items included in the channel scroll UI 500. The current channel indicator 510 provides a visual effect for identifying that a channel item corresponding to the current channel indicator 510 is a current channel.

For example, when a pre-designated input of triggering display of a channel scroll UI is a long press signal, the display apparatus 100 displays a channel scroll UI after recognizing the long press signal, and displays the current channel indicator 510 on a channel item corresponding to the current channel. The display apparatus 100 may move the current channel indicator between the channel items of the channel scroll UI 500 as a long press of a channel up button or a channel down button continues.

To generate and display the channel scroll UI 500, the display apparatus 100 needs to know information about a channel map corresponding to content provided by the display apparatus 100. To display a current channel indicator, the display apparatus 100 needs to recognize a channel number currently displayed on the display apparatus 100 via an OCR module or the like.

Figure 6:
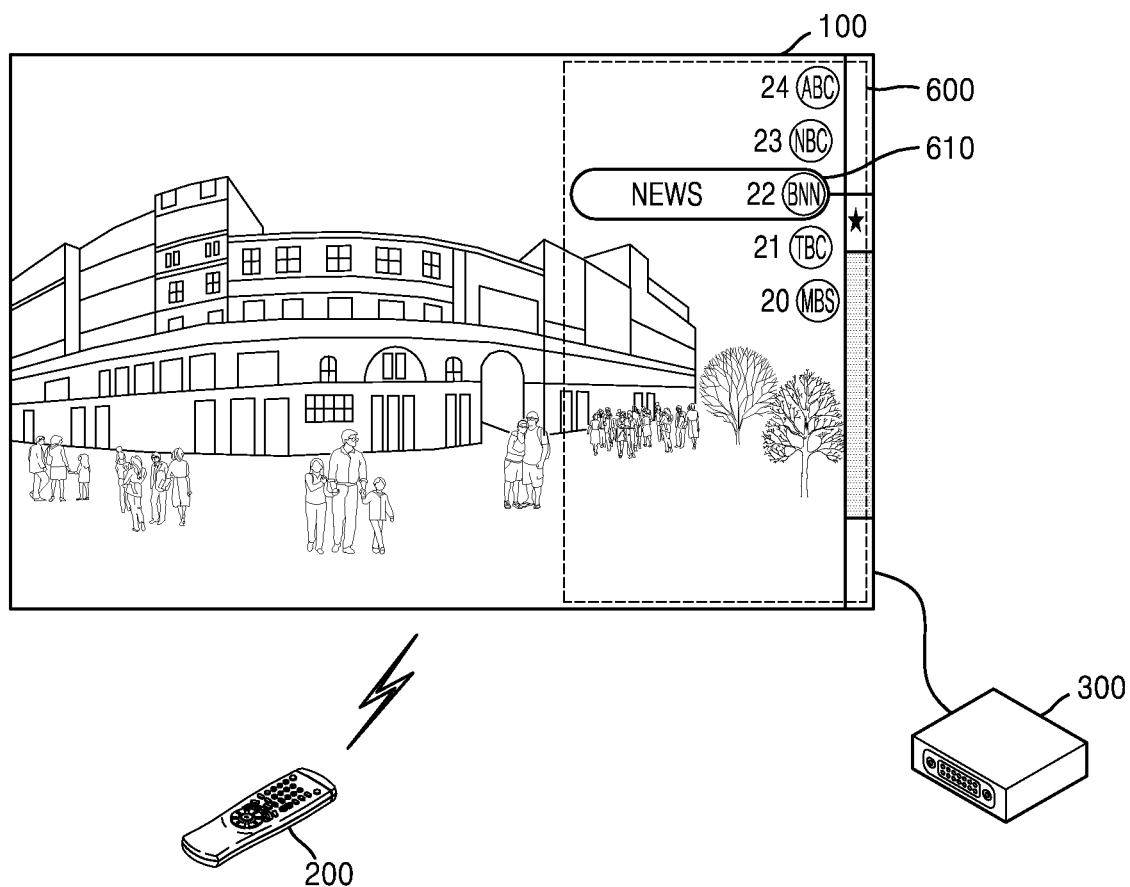
FIG. 6 is a schematic diagram illustrating an example of a channel scroll UI according to an embodiment.

FIG. 6 is a schematic diagram illustrating an example of a channel scroll UI 600 according to an embodiment.

Referring to FIG. 6, channel numbers and channel IDs may be displayed on channel items included in the channel scroll UI 600. A channel item indicated by a current channel indicator 610 may further display the category of content corresponding to a channel, for example, news, a drama, or a sports program.

According to an embodiment, while a long press signal of a user continues, a current channel indicator may move between the channel items of a channel scroll UI, and, when the long press signal is terminated, the current channel indicator may be fixed onto one channel item and may be displayed. Due to a specific event, the display apparatus 100 may switch a channel to a channel corresponding to the channel item on which the current channel indicator is fixed and displayed, and may display content of the switched-to channel on the display. For example, the specific event may be an event indicating that the long press signal has been terminated and then a predefined period of time has lapsed, or an input or the like corresponding to pressing of a specific button by the user.

Figure 8:
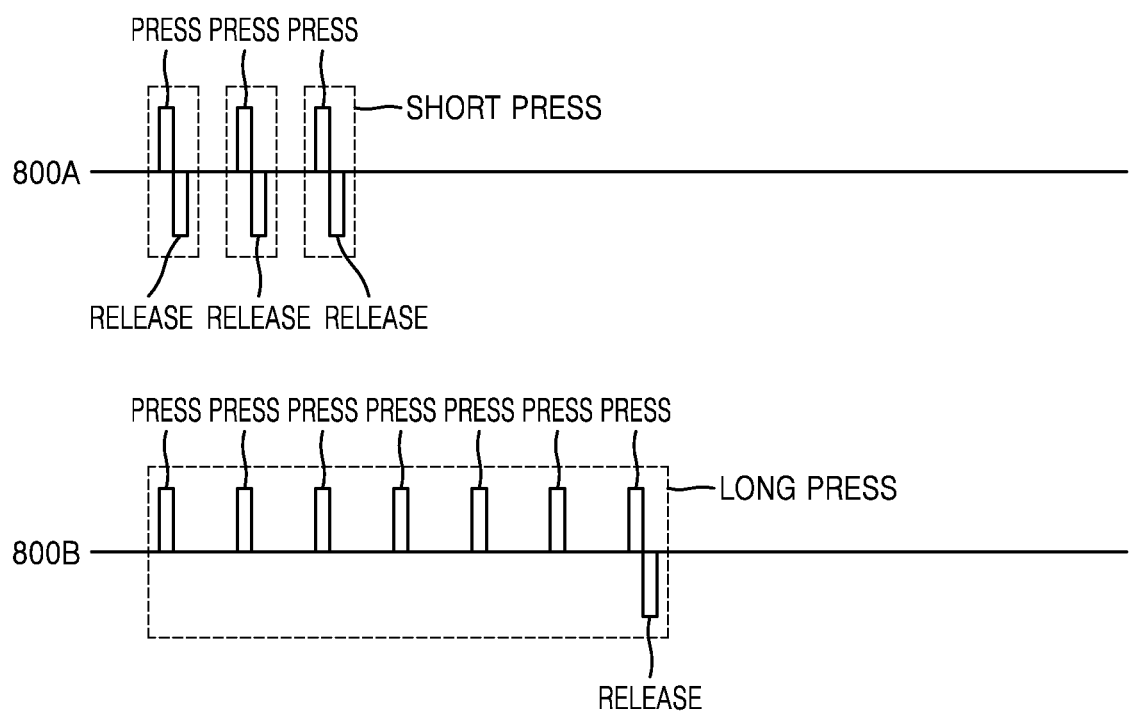
FIG. 8 is a reference diagram for explaining an example of a short press and a long press.

FIG. 8 is a reference diagram for explaining an example of a short press and a long press.

In FIG. 8, a reference numeral 800A indicates an example of a short press signal, and a reference numeral 800B indicates an example of a long press signal.

Information related to a key received from a remote control apparatus, such as a remote controller, includes press information about pressing a key and release information about releasing a key. A case where release information of a certain key is received immediately after press information of the certain key is received is referred to as a short press, and a case where press information of a certain key is received and then press information of the certain key is received in a row is referred to as a long press. When a press of a key is determined to be a long press, the display apparatus 100 displays a channel scroll UI based on a channel database (DB) stored in a memory, and moves a channel indicator upwards or downwards on the channel scroll UI until a release key is sensed. When the release key has been sensed, the display apparatus 100 stops scrolling of the channel indicator and enters a detailed manipulation mode. When the display apparatus 100 enters the detailed manipulation mode, the display apparatus 100 may operate with a short press on the channel scroll UI, and may move the channel indicator one channel at a time upwards or downwards. When a long press is input in the detailed manipulation mode, the channel indicator moves again upwards or downwards.

Referring to 800A of FIG. 8, a press signal is generated by pressing a button included in the remote control apparatus, and a release signal is generated by releasing the button pressing. The release signal is generated before a predetermined period of time lapses after the press signal is generated, and thus a short press signal may be generated. In response to a short press signal corresponding to a button included in the remote control apparatus as such, a display apparatus may perform a function corresponding to the button. For example, in response to a short press signal corresponding to a channel up button, the display apparatus may perform a function corresponding to the channel up button, namely, a channel switch corresponding to channel up.

Referring to 800B of FIG. 8, a press signal is generated by pressing a button included in the remote control apparatus. At this time, when no release signals indicating a release of the button pressing are generated before the lapse of a predetermined period of time, the remote control apparatus may periodically generate the press signal until the release signal is generated. When no release signals are generated before a predetermined period of time lapses after the press signal is generated, a long press signal may be generated. In response to a long press signal corresponding to a button included in the remote control apparatus, the display apparatus may define a new function. For example, in response to a short press signal corresponding to the channel up button, the display apparatus may output a channel scroll UI and may scroll the channel items on the channel scroll UI in a channel up direction.

Figure 7:
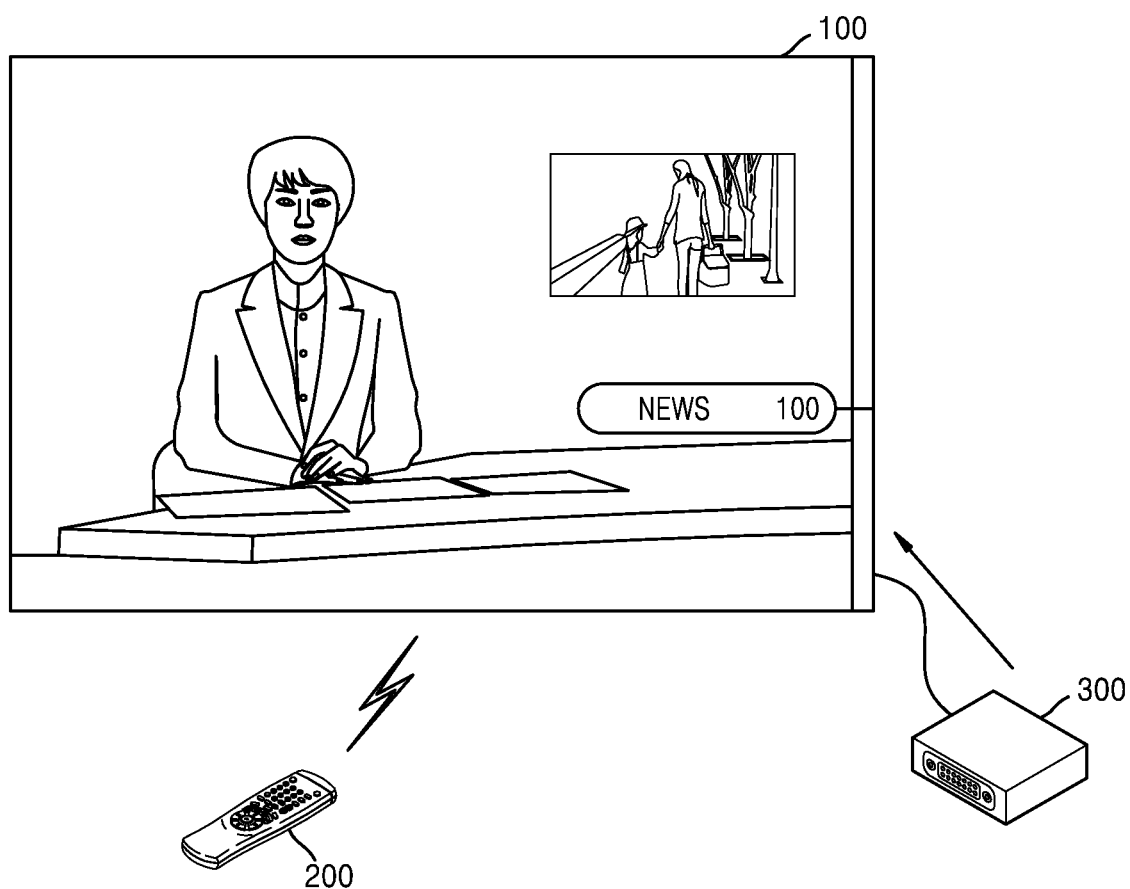
FIG. 7 is a schematic diagram illustrating an example of a channel scroll UI according to an embodiment.

FIG. 7 is a schematic diagram illustrating an example of a channel scroll UI according to an embodiment.

Referring to FIG. 7, after a long press is terminated, channels are moved through one by one, channels are switched according to the channel movement, and a switched-to channel is displayed.

Figure 9:
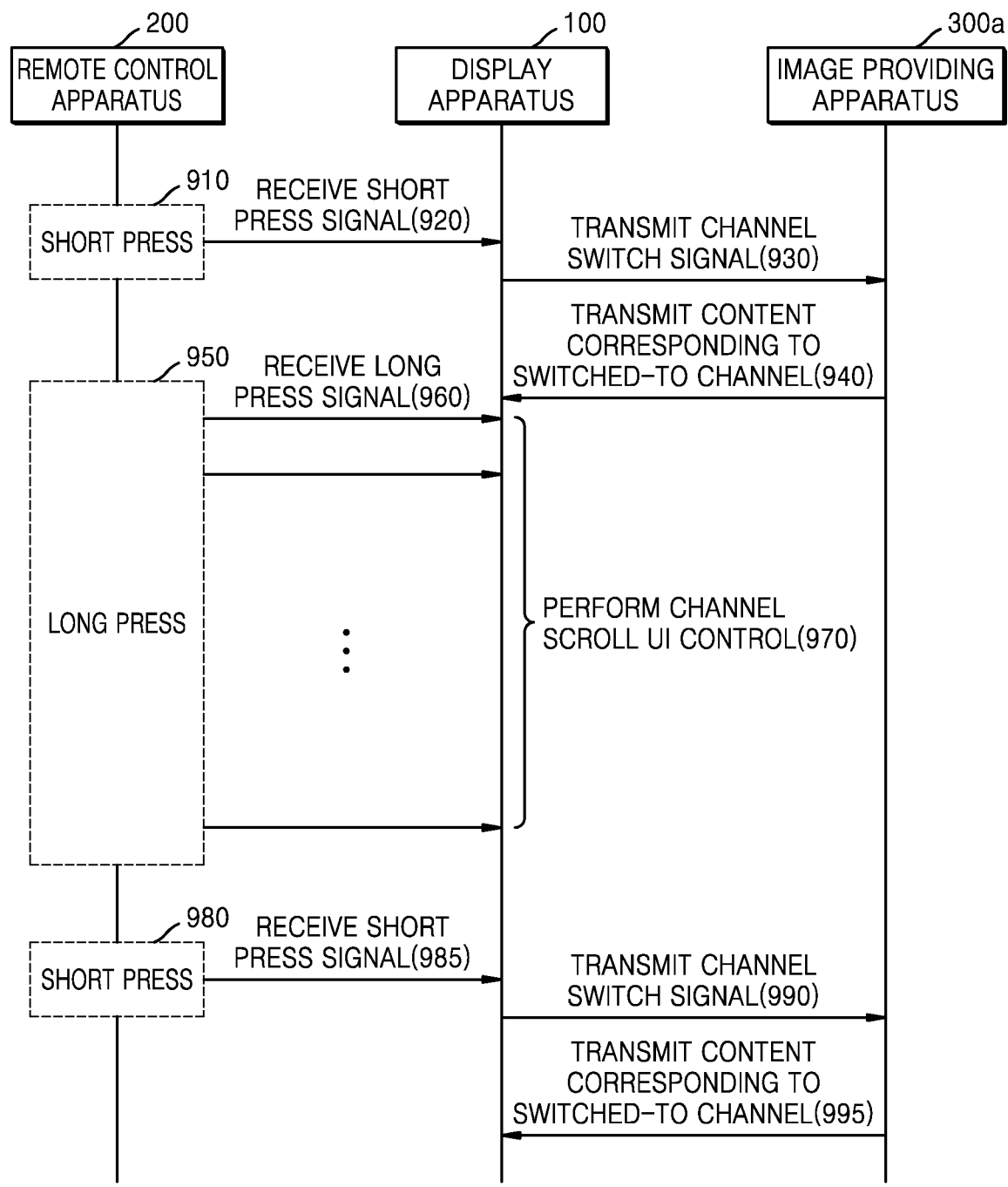
FIG. 9 is a reference diagram for explaining an operation of a display apparatus that receives an image from an external image providing apparatus and displays the image when the display apparatus receives a short press signal and a long press signal, according to an embodiment.

FIG. 9 is a reference diagram for explaining an operation of a display apparatus that receives an image from an external image providing apparatus and displays the image when the display apparatus receives a short press signal and a long press signal, according to an embodiment.

Referring to FIG. 9, when a button included in the remote control apparatus 200 is pressed and the pressing is released before a predefined period of time lapses, a short press signal 910 may be generated. For example, a button related to the short press signal is referred to as a channel up/down button. In operation 920, the display apparatus 100 receives the short press signal from the remote control apparatus 200. In operation 930, to perform a function corresponding to the button related to the received short press signal, namely, a channel up function, the display apparatus 100 may transmit a channel switch signal of a channel up/down to an image providing apparatus 300a. In operation 940, the image providing apparatus 300a may switch between channels according to the received channel switch signal and transmit content corresponding to a switched-to channel to the display apparatus 100. As such, a general operation under the control of the image providing apparatus 300a may be performed in response to the short press signal.

When the button included in the remote control apparatus 200 is pressed and the pressing is not released before the predefined period of time lapses, a long press signal 950 may be generated. In operation 960, the display apparatus 100 receives the long press signal from the remote control apparatus 200. At this time, the display apparatus 100 may not use the long press signal as the channel switch signal but may use the long press signal to perform a channel scroll UI control (operation 970).

During the channel scroll UI control, the display apparatus 100 does not perform a general image providing apparatus controlling operation, and thus transmits no channel switch signals to the image providing apparatus 300a. During the channel scroll UI control, the display apparatus 100 may display a channel scroll UI on the display of the display apparatus 100. The channel scroll UI may represent an example as described above with reference to FIGS. 5-7.

When the long press signal 950 is terminated and the display apparatus 100 receives a short press signal 980 in operation 985, the display apparatus 100 may transmit a channel switch signal to the image providing apparatus 300a, in operation 990, receive content of a switched-to channel switched to in response to the channel switch signal from the image providing apparatus 300a, in operation 995, and display the received content.

FIG. 10 is a block diagram of a display apparatus 100 according to an embodiment.

In FIG. 10, components of the display apparatus 100 for describing a channel scroll UI controlling operation according to an embodiment are focused and illustrated.

Referring to FIG. 10, the display apparatus 100 includes the display 110, the TV viewer module 123, the OCR module 124, and the MBR module 125.

The TV viewer module 123 may receive a channel switch input from a remote control apparatus and transmit the received channel switch input to the MBR module 125.

When the TV viewer module 123 receives a press signal from the remote control apparatus, the TV viewer module 123 may transmit the press signal to the MBR module 125.

When the TV viewer module 123 receives a long press detection signal from the MBR module 125, the TV viewer module 123 may check a current channel and control the display 110 to display a channel scroll UI based on the checked current channel, by referring to the OCR module 124a.

The OCR module 124a may monitor a channel currently displayed on the display 110 at regular intervals and thus may maintain information about the current channel. In other words, to recognize content output to a screen via a set-top box, the OCR module 124a performs OCR based on pre-stored OCR performing area information to thereby determine what the current channel is. The OCR performing area information may differ according to broadcasting providers and may be received from a server. OSD composition information corresponding to a set-top box may be transmitted from the set-top box to a display apparatus or may be transmitted to the display apparatus via an external server. The OSD composition information includes information about locations, sizes, a distance, and the like of OSD components, such as a channel number, a broadcasting station name, and a content title, displayed on the display apparatus, and differs according to set-top boxes.

The OCR module 124a may extract the OSD components from an area of content according to the OSD composition information and recognize the OSD components as characters to thereby obtain information about a displayed image. According to such a recognition module, the display apparatus 100 may obtain channel information corresponding to a content image received from the set-top box, from the received content image.

The MBR module 125 may determine whether an operation corresponding to IR information received from the remote control apparatus needs to occur on a TV or on a set-top box. When it is determined that the operation corresponding to the IR information needs to occur on the TV, the operation may be performed on the TV. On the other hand, when it is determined that the operation corresponding to the IR information needs to occur in the set-top box, the MBR module 125 may control an IR blaster connected to the TV to transmit IR corresponding to the received IR information. Alternatively, when it is determined that the operation corresponding to the IR information needs to occur in the set-top box, the MBR module 125 may convert IR transmitted to the TV into IR corresponding to the set-top box, and transmit the IR corresponding to the set-top box to a remote controller, and the remote controller may transmit the IR corresponding to the set-top box to the set-top box.

When the MBR module 125 receives the press signal from the TV viewer module 123, the MBR module 125 may generate a channel control signal corresponding to the press signal and transmit the channel control signal to a set-top box 300a.

When the MBR module 125 receives the press signal again instead of receiving a release signal after receiving the press signal, the MBR module 125 may recognize this case as a long press signal. When it is determined that the long press signal has been detected, the MBR module 125 may transmit the long press detection signal to the TV viewer module 123.

In FIG. 10, the MBR module 125 and the TV viewer module 123 are separate blocks. However, according to another embodiment, the MBR module 125 and the TV viewer module 123 may be incorporated into a single block that performs respective functions of the MBR module 125 and the TV viewer module 123.

When a current display mode of the display apparatus 100 is an external source to which a set-top box is connected, and a signal received from a remote controller corresponds to a long press, the MBR module 125 controls the IR blaster to transmit only a signal corresponding to one press to the set-top box, and the TV viewer module 123 generates a channel scroll UI based on the channel DB stored in the memory and displays the generated channel scroll UI. Thereafter, the signal received from the remote controller is used to control the displayed channel scroll UI. When the MBR module 125 is unable to secure channel information about the connected set-top box, such as, when the MBR module 125 is unable to ascertain a broadcasting provider of the connected set-top box, the MBR module 125 controls the IR blaster to transmit IR information received from the remote controller to the set-top box. In other words, when there is no channel information about the set-top box in a situation where a channel up key is continuously received, the controller 130 does not perform an operation corresponding to a channel UP and may control the IR blaster to continuously emit an IR code enabling the set-top box to perform a channel UP.

When the display apparatus 100 executes the channel scroll UI corresponding to the channel information of the set-top box, the display apparatus 100 starts a scroll bar at a location of the current channel checked by the OCR module 124a. A user may fast and conveniently search for a channel map of the set-top box stored in a TV DB via the scroll bar. In a fast manipulation mode (FIG. 6) using a long press of the scroll bar or a detailed manipulation mode (FIG. 7) using a short press, the user may determine a channel to be watched. The user may finally determine the to-be-watched channel by using two methods of: inputting and selecting an EnterKey or the like when the user is located at a selected channel; and waiting for until a certain period of time (for example, a two-second timeout) passes. When a user determines the to-be-watched channel using these methods, a display apparatus may control an IR blaster, via an MBR module, to transmit information corresponding to a channel number included in channel information stored in a channel map to a set-top box.

Figure 11:
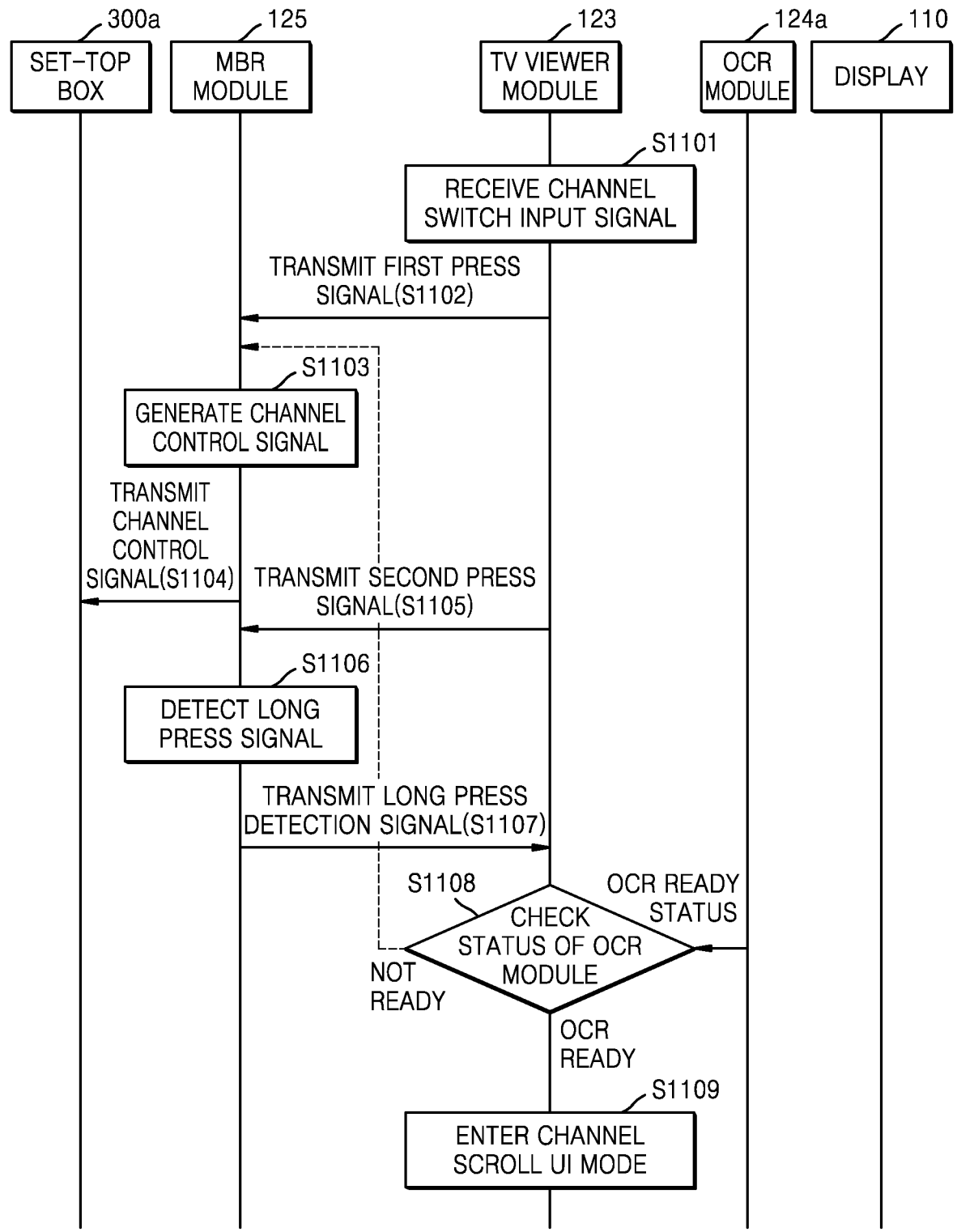
FIGS. 11 and 12 are flowcharts of a method of operating the display apparatus of FIG. 10, according to an embodiment.
Figure 12:
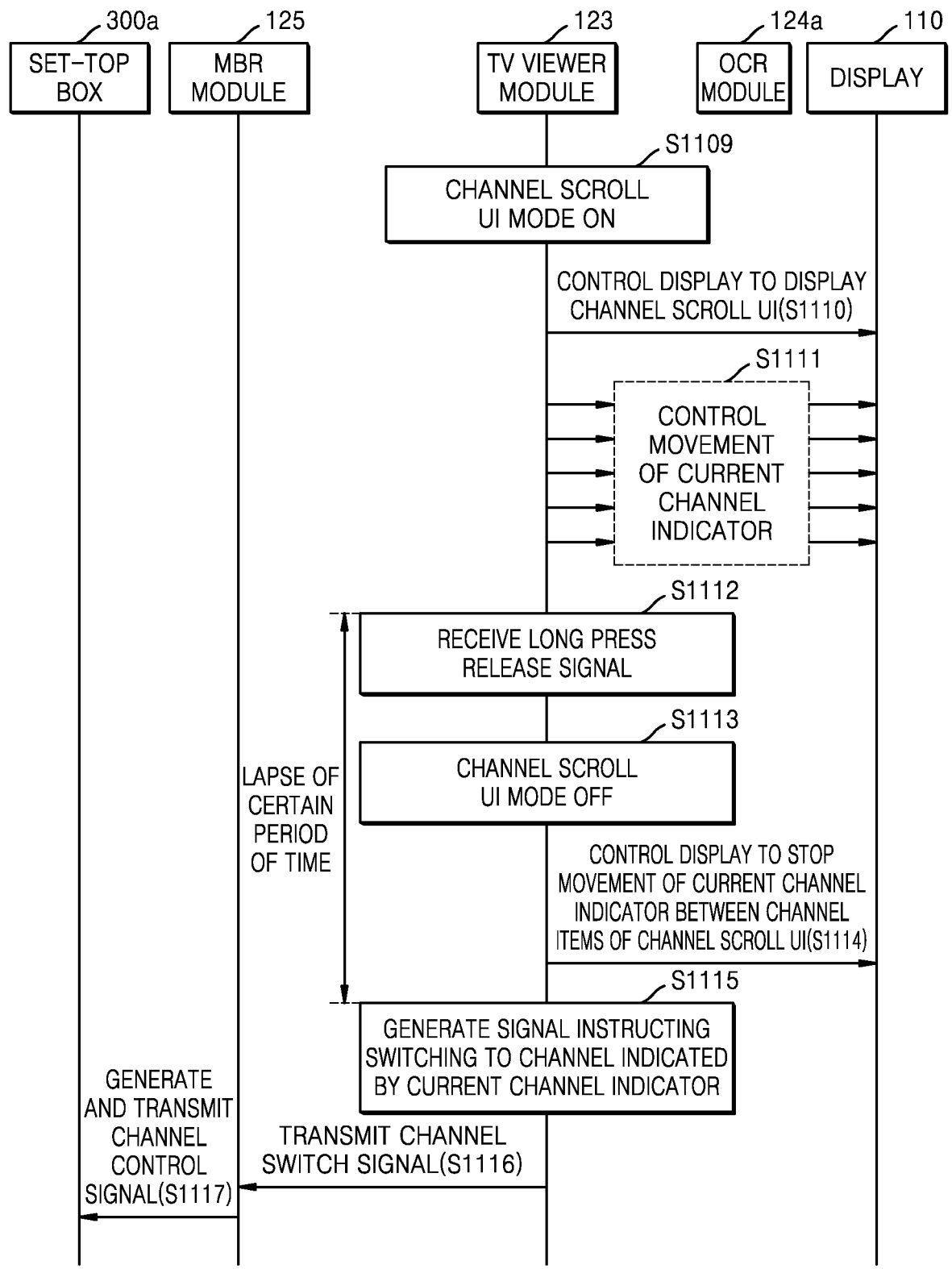

FIGS. 11 and 12 are flowcharts of a method of operating the display apparatus 100 of FIG. 10, according to an embodiment.

Referring to FIG. 11, in operation S1101, the TV viewer module 123 receives a channel switch input signal from the remote control apparatus.

Figure 13:
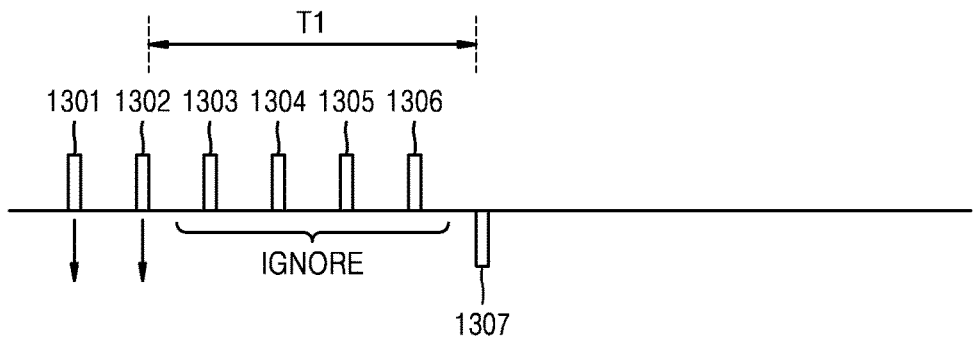
FIG. 13 illustrates a press/release signal according to an embodiment.

For example, it is assumed that the channel switch input signal received from the remote control apparatus is a press signal 1301 of FIG. 13 and the press signal 1301 corresponds to a signal indicating pressing of a channel up button of the remote control apparatus.

In operation S1102, the TV viewer module 123 may transmit a first press signal according to the received channel switch input signal to the MBR module 125.

In operation S1103, in response to the channel switch input signal from the TV viewer module 123, the MBR module 125 may generate a channel control signal corresponding to the channel switch input signal. For example, the MBR module 125 may generate a channel control signal corresponding to channel up, in response to the press signal 1301 indicating pressing of the channel up button.

In operation S1104, the MBR module 125 may transmit the channel control signal to the set-top box 300a. In response to the channel control signal, the set-top box 300a may perform a channel switch corresponding to channel up according to the channel control signal and may transmit content of a switched-to channel to the display apparatus 100. The display apparatus 100 may receive and display the content of the switched-to channel.

Examples of a method in which the MBR module 125 controls the set-top box 300a include a method in which the MBR module 125 directly controls the set-top box 300a and a method in which the MBR module 125 controls the set-top box 300a via the remote control apparatus 200. Examples of the method in which the MBR module 125 directly controls the set-top box 300a include a method in which the MBR module 125 directly transmits a channel control IR signal to the set-top box 300a by using an IR blaster. Examples of the method in which the MBR module 125 controls the set-top box 300a via the remote control apparatus 200 include a method in which the MBR module 125 transmits a channel control signal to the remote control apparatus 200 via a communication interface and the remote control apparatus 200 transmits a channel control IR signal corresponding to the channel control signal to the set-top box 300a.

Referring to FIG. 13, when no release signals are generated after the first press signal 1301 is generated, a press signal may be generated periodically. For example, when a user presses a channel up button of a remote control apparatus and then does not release the pressing, the remote control apparatus may periodically generate a press signal until the user releases the channel up button, and may transmit the generated press signals to a display apparatus.

In operation S1105, the TV viewer module 123 may transmit a second press signal (for example, a second press signal 1302 of FIG. 13) to the MBR module 125.

In operation S1106, when the MBR module 125 receives the first press signal 1301 and then receives the second press signal 1302 in a row without receiving a release signal, the MBR module 125 may detect a long press signal.

In operation S1107, when the MBR module 125 detects the long press signal, the MBR module 125 may transmit a long press detection signal to the TV viewer module 123. When the MBR module 125 determines that the long press signal has been detected and accordingly transmits a detection signal to the TV viewer module 123 as described above, the MBR module 125 determines that the display apparatus 100 performs an operation according to the long press detection. In other words, when the MBR module 125 has received a general short press signal, the MBR module 125 transmits a channel control signal according to the short press signal to the set-top box 300a. However, when the MBR module 125 determines that the long press signal has been detected, even when the MBR module 125 receives a press signal from the TV viewer module 123, the MBR module 125 may ignore the received press signal without performing a channel control operation corresponding to the received press signal. In other words, the MBR module 125 performs no operations in correspondence with the received press signal.

In operation S1108, when the TV viewer module 123 receives the long press detection signal from the MBR module 125, the TV viewer module 123 checks a status of the OCR module 124a in order to determine whether to enter a channel scroll UI mode. In other words, when the TV viewer module 123 determines that the status of the OCR module 124*a* is an OCR ready status, the TV viewer module 123 may perform operation S1109 to enter the channel scroll UI mode. The OCR ready status means a status in which the OCR module 124*a* perform OCR and checks information about a current channel currently displayed on the display apparatus 100. When the OCR module 124*a* is unable to check the information about the current channel currently displayed on the display apparatus 100 due to a certain cause of the OCR module 124*a*, the status of the OCR module 124*a* is not the OCR ready status.

When the TV viewer module 123 checks that the status of the OCR module 124*a* is not the OCR ready status in operation S1108, the TV viewer module 123 may transmit to the MBR module 125 status information representing that the OCR module 124*a* is not ready. In response to the status information representing that the OCR module 124*a* is not ready, the MBR module 125 may ignore the previous operation corresponding to the long press signal detection. In other words, according to the long press detection, the MBR module 125 may ignore a subsequently received press signal without a channel control operation corresponding to the subsequently received press signal. However, in response to the status information representing that the OCR module 124*a* is not ready, the MBR module 125 may again perform a channel control operation corresponding to the subsequently received press signal. In other words, when the OCR module 124*a* is not ready statue, the OCR module 124*a* is unable to perform an operation corresponding to a long press signal, and thus the MBR module 125 may ignore the long press detection performed in operation S1106 and may prepare to perform an operation corresponding to a newly received press signal.

In operation S1109, the TV viewer module 123 enters the channel scroll UI mode. In the channel scroll UI mode, the channel scroll UI is output to the display in order to help a fast channel search. Thus, the channel scroll UI mode may be referred to as a fast manipulation mode. In a fast manipulation mode, without switching content displayed on the display, only a channel movement is displayed on a channel scroll bar.

Referring to FIG. 12, in operation S1110, the TV viewer module 123 may control the display 110 to display the channel scroll UI. The channel scroll UI may display a plurality of channel items and display a current channel indicator on a current channel, as shown in FIGS. 6-8. The current channel may be checked by the OCR module 124*a* in operation S1108.

In operation S1111, while the long press signal continues, the TV viewer module 123 may control a movement of the current channel indicator on the channel scroll UI. In other words, while the long press signal continues, the current channel indicator moves between the channel items of the channel scroll UI. A section in which the long press signal continues means, for example, a section of FIG. 13 in which the second press signal 1302, a third press signal 1303, etc. after the first press signal 1301 are consecutively received.

In operation S1112, the TV viewer module 123 receives a long press release signal. The long press release signal may indicate, for example, a release signal 1307 received after a sixth press signal 1306 in FIG. 13.

When the long press release signal is received, the TV viewer module 123 terminates the channel scroll UI mode, in operation S1113. The termination of the channel scroll UI mode may be referred to as entering a detailed manipulation mode. In the detailed manipulation mode, the user may switch between channels by moving the channels one by one by pressing a button of the remote control apparatus with a short press.

In operation S1114, when the TV viewer module 123 terminates the channel scroll UI mode, the TV viewer module 123 controls the display 110 to stop movement of the current channel indicator between the channel items of the channel scroll UI.

According to an embodiment, due to a specific event, the display apparatus may switch current content to content of a channel indicated by the current channel indicator and display the switched-to content. For example, the specific event may be an input of selecting the channel or lapse of a certain period of time.

In operation S1115, when a certain period of time has lapsed after the TV viewer module 123 receives the long press release signal, the TV viewer module 123 may generate a signal instructing switching to the channel indicated by the current channel indicator. For example, when the current channel indicator is located at channel No. 10 on the channel scroll UI, a signal instructing switching to the channel No. 10 may be generated.

In operation S1116, the TV viewer module 123 transmits the channel switch signal to the MBR module 125.

In operation S1117, the MBR module 125 may generate a channel control signal corresponding to the channel switch signal received from the TV viewer module 123 and transmit the channel control signal to the set-top box 300*a*.

Figure 14:
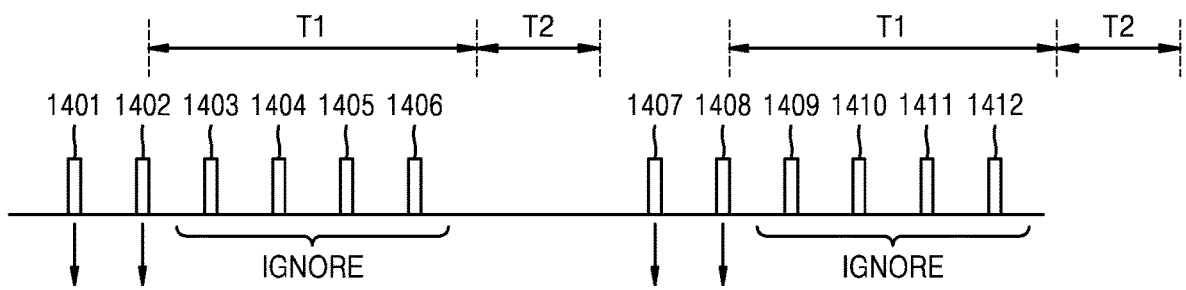
FIG. 14 illustrates a press/release signal according to another embodiment.

FIG. 14 illustrates a press/release signal according to an embodiment.

In the case of a typical long press signal, press signals (1301-1306 of FIG. 13) are generated while a user is continuously pressing a channel up/down button, and, when the user releases the pressing of the channel up/down button, the release signal 1307 is generated. In such a case, it may be checked from the release signal 1307 that a long press has terminated. However, due to several causes, after the lapse of a certain period of time without a release signal after the long press signal, a press signal may be received again. In this case, an operation of a display apparatus needs to be considered.

Referring to FIG. 14, when press signals 1407 and 1408 are received after the lapse of a time period T2 without release signals after long press signals 1401-1406 are received, the display apparatus may determine that a new long press starts, and may enter the channel scroll UI mode.

Figure 15:
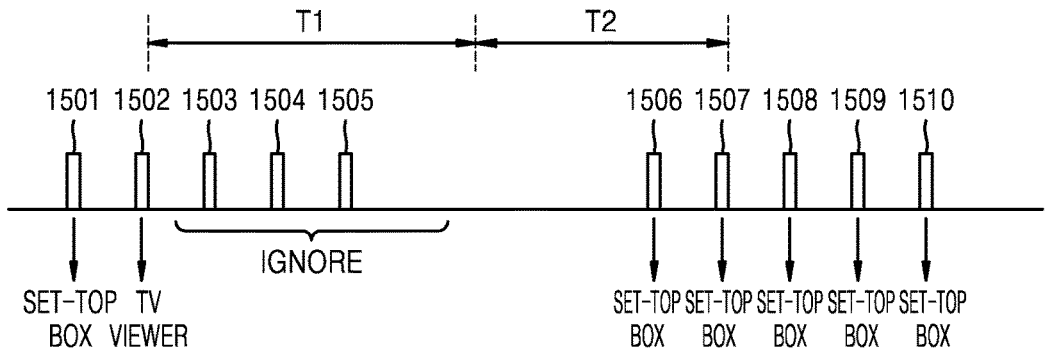
FIG. 15 illustrates a press/release signal according to another embodiment.

FIG. 15 illustrates a press/release signal according to another embodiment.

Referring to FIG. 15, when a press signal 1506 is received before the lapse of a time period T2 without release signals after long press signals 1501-1505 are received, a display apparatus may use the press signal 1506 in a channel switch control to thereby send a channel control signal to a set-top box, and may also use a press signal 1507 received next to the press signal 1506 as a channel control signal.

For example, although the display apparatus 100 has tried to enter a channel scroll UI mode because an input received from a remote control apparatus corresponds to a long press signal, the display apparatus 100 may not be able to enter the channel scroll UI mode due to several causes. For example, because an OCR module is not in a ready status, the display apparatus 100 may not be able to display a channel scroll UI again. At this time, when the display apparatus 100 has received the press signal 1506 again before the lapse of the time period T2, the display apparatus 100 may use the received press signal 1506 to control a set-top box and may also use subsequently received signals 1507-1510 to control the set-top box.

According to embodiments, a method capable of fast and conveniently searching for a channel by using a scroll bar with respect to channels connected to an RF antenna and stored and by also using a scroll bar with respect to channels of a set-top box which is an external image providing apparatus may be provided.

A method of operating a display apparatus according to an embodiment may be embodied as program commands executable by various computer means and may be recorded on a computer-readable recording medium. The computer-readable recording medium may include program commands, data files, data structures, and the like separately or in combinations. The program commands to be recorded on the computer-readable recording medium may be specially designed and configured for embodiments of the present disclosure or may be well-known to and be usable by one of ordinary skill in the art of computer software. Examples of the computer-readable recording medium include a magnetic medium such as a hard disk, a floppy disk, or a magnetic tape, an optical medium such as a compact disk-read-only memory (CD-ROM) or a digital versatile disk (DVD), a magneto-optical medium such as a floptical disk, and a hardware device specially configured to store and execute program commands such as a ROM, a random-access memory (RAM), or a flash memory. Examples of the program commands are advanced language codes that can be executed by a computer by using an interpreter or the like as well as machine language codes made by a compiler.

While one or more embodiments have been described with reference to the figures, it will be understood by those of ordinary skill in the art that various changes in form and details may be made therein without departing from the spirit and scope as defined by the following claims.

What is claimed is:

1. A display apparatus comprising:
   an external device control interface arranged to communicate with an external image providing apparatus which provides content to the display apparatus;
   a display;
   a memory configured to store at least one instruction; and
   a processor configured to execute the at least one instruction stored in the memory so as to:
   obtain channel information corresponding to the external image providing apparatus, the channel information comprising information on a plurality of channels which are provided by the external image providing apparatus;
   receive continual press signals corresponding to a long press input for a channel control;
   based on a first press signal among the continual press signals of the long press input, transmit a channel control signal corresponding the first press signal to the external image providing apparatus to change a current channel of the external image providing apparatus;
   based on one or more press signals following the first press signal among the continual press signals of the long press input and the channel information having been successfully obtained, perform a channel scroll using a channel scroll user interface (UI) to select a target channel based on the channel information without transmitting information associated with the one or more press signals following the first press signal to the external image providing apparatus;
   based on the one or more press signals following the first press signal and the channel information not having been successfully obtained, transmit, to the external image providing apparatus via the external device control interface, information indicating each of the one or more press signals following the first press signal; and
   based on receiving an input corresponding to a release of the long press input and the channel information having been successfully obtained, transmit, to the external image providing apparatus via the external device control interface, information associated with the target channel selected via the channel scroll.

2. The display apparatus of claim 1, wherein the long press input corresponds to an input in which a channel button of a remote control apparatus is selected for more than a predefined period of time.

3. The display apparatus of claim 2, wherein the channel scroll user interface (UI) includes a plurality of channel items based on the channel information corresponding to the external image providing apparatus, and a current channel indicator indicating a channel item from among the plurality of channel items, and
   the processor is further configured to execute the at least one instruction to move the current channel indicator along the plurality of channel items included in the channel scroll UI according to a duration of the long press input.

4. The display apparatus of claim 1, wherein the processor is further configured to execute the at least one instruction to identify the channel information by analyzing a portion of an image which is received from the external image providing apparatus.

5. The display apparatus of claim 1, wherein the processor is further configured to execute the at least one instruction to:
   in response to a channel control input being received while the channel scroll user interface (UI) is displayed, prohibit a channel control signal corresponding to the received channel control input from being transmitted to the external image providing apparatus, and
   control a current channel indicator to be displayed in the channel scroll user interface (UI) according to the channel control input.

6. The display apparatus of claim 3, wherein the processor is further configured to execute the at least one instruction to stop movement of the current channel indicator among the plurality of channel items included in the channel scroll UI in response to detection of the input corresponding to the release of the long press input.

7. The display apparatus of claim 6, wherein the processor is further configured to execute the at least one instruction to display content corresponding to a selected current channel item indicated by the current channel indicator on the display in response to a specific event, and
   wherein the specific event includes a user input of selecting the current channel item or a lapse of a predefined period of time after the input corresponding to the release of the long press input is detected.

8. A method of operating a display apparatus that includes an external device control interface arranged to communicate with an external image providing apparatus which provides content to the display apparatus, the method comprising:
   obtaining channel information corresponding to the external image providing apparatus, the channel information comprising information on a plurality of channels which are provided by the external image providing apparatus;

receiving continual press signals corresponding to a long press input for a channel control;

identifying the channel information corresponding to the external image providing apparatus has been successfully obtained;

based on a first press signal of the long press input, transmitting a channel control signal corresponding to the first press signal to the external image providing apparatus via the external device control interface to change a current channel of the external image providing apparatus;

based on one or more press signals following the first press signal among the continual press signals of the long press input and the channel information being identified as successfully obtained, performing a channel scroll using a channel scroll user interface (UI) to select a target channel based on the channel information without transmitting information associated with the one or more press signals following the first press signal to the external image providing apparatus;

based on the one or more press signals following the first press signal and the channel information not having been successfully obtained, transmitting, to the external image providing apparatus via the external device control interface, information indicating each of the one or more press signals following the first press signal; and based on receiving an input corresponding to a release of the long press input and the channel information being identified as successfully obtained, transmitting, to the external image providing apparatus via the external device control interface, information associated with the target channel selected via the channel scroll.

9. The method of claim 8, wherein the long press input corresponds to an input in which a channel button of a remote control apparatus is selected for more than a predefined period of time.

10. The method of claim 9, wherein the channel scroll user interface (UI) includes a plurality of channel items based on the channel information, and a current channel indicator indicating a channel item from among the plurality of channel items, and the method further comprises moving the current channel indicator along the plurality of channel items included in the channel scroll UI according to a duration of the long press input.

11. The method of claim 8, wherein the method further comprises identifying the channel information by analyzing a portion of an image which is received from the external image providing apparatus.

12. The method of claim 8, wherein the method further comprises:

in response to a channel control input being received while the channel scroll user interface (UI) is displayed, prohibiting a channel control signal corresponding to the received channel control input from being transmitted to the external image providing apparatus, and controlling a current channel indicator displayed in the channel scroll user interface (UI) according to the channel control input.

13. The method of claim 10, further comprising stopping movement of the current channel indicator along the plurality of channel items included in the channel scroll UI, in response to detection of the input corresponding to the release of the long press input, and displaying the current channel indicator to a channel item.

14. The method of claim 13, further comprising transmitting, to the external image providing apparatus, the information associated with the channel item indicated by the current channel indicator, in response to a specific event, wherein the specific event includes a user input of selecting the channel item or a lapse of a predefined period of time after the input corresponding to the release is detected.

15. A non-transitory computer-readable recording medium having recorded thereon a computer program, which, when executed by a computer, performs a method of operating a display apparatus that includes an external device control interface arranged to communicate with an external image providing apparatus which provides content to the display apparatus, the method including:

obtaining channel information corresponding to the external image providing apparatus, the channel information comprising information on a plurality of channels which are provided by the external image providing apparatus;

receiving continual press signals corresponding to a long press input for a channel control;

based on a first press signal of the long press input, transmitting a channel control signal corresponding to the first press signal to the external image providing apparatus via the external device control interface to change a current channel of the external image providing apparatus;

based on one or more press signals following the first press signal among the continual press signals of the long press input and the channel information having been successfully obtained, performing a channel scroll using a channel scroll user interface (UI) to select a target channel based on the channel information without transmitting information associated with the one or more press signals following the first press signal to the external image providing apparatus;

based on the one or more press signals following the first press signal and the channel information not having been successfully obtained, transmitting, to the external image providing apparatus via the external device control interface, information indicating each of the one or more press signals following the first press signal; and based on receiving an input corresponding to a release of the long press input and the channel information having been successfully obtained, transmitting, to the external image providing apparatus via the external device control interface, information associated with the target channel selected via the channel scroll.

16. The display apparatus of claim 1, wherein the external image providing apparatus is a set-top box.

17. The display apparatus of claim 1, wherein the channel scroll is performed without performing channel change.

* * * * *